United States Patent
Park et al.

(10) Patent No.: US 11,611,380 B2
(45) Date of Patent: Mar. 21, 2023

(54) METHOD AND APPARATUS FOR REPORTING CHANNEL STATE INFORMATION IN WIRELESS COMMUNICATION SYSTEM

(71) Applicant: LG ELECTRONICS INC., Seoul (KR)

(72) Inventors: Haewook Park, Seoul (KR); Hyungtae Kim, Seoul (KR); Jiwon Kang, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/263,510

(22) PCT Filed: Jul. 29, 2019

(86) PCT No.: PCT/KR2019/009408
§ 371 (c)(1),
(2) Date: Jan. 26, 2021

(87) PCT Pub. No.: WO2020/022856
PCT Pub. Date: Jan. 30, 2020

(65) Prior Publication Data
US 2021/0242914 A1    Aug. 5, 2021

(30) Foreign Application Priority Data

Jul. 27, 2018  (KR) .................. 10-2018-0087573
Aug. 9, 2018  (KR) .................. 10-2018-0092829

(51) Int. Cl.
*H04B 7/0456*   (2017.01)
*H04L 5/00*   (2006.01)

(52) U.S. Cl.
CPC ......... *H04B 7/0486* (2013.01); *H04L 5/0048* (2013.01)

(58) Field of Classification Search
CPC .... H04B 7/0486; H04B 7/0478; H04B 7/063; H04B 7/0626
See application file for complete search history.

(56) References Cited

U.S. PATENT DOCUMENTS

2012/0218948 A1   8/2012   Onggosanusi et al.
2016/0323022 A1*  11/2016  Rahman ............... H04B 7/0469
(Continued)

FOREIGN PATENT DOCUMENTS

CN   103516464   1/2014
CN   104365137   2/2015
(Continued)

OTHER PUBLICATIONS

R1-1807187, Remaining Issue on Type II CSI Omission, 3GPP TSG RAN WG1 Meeting #93, Nokia, Nokia Shanghai Bell, Korea, May 21-25, 2018 (Year: 2018).*
(Continued)

*Primary Examiner* — Aristocratis Fotakis
(74) *Attorney, Agent, or Firm* — Lee Hong Degerman Kang Waimey

(57) ABSTRACT

The present disclosure relates to a method, performed by a user equipment (UE), for reporting channel state information (CSI) in a wireless communication system and an apparatus therefor. According to the present disclosure, the UE receives a channel state information reference signal (CSI-RS) from a base station through a multiple antenna port; and reports the CSI to the base station, wherein the CSI includes a precoding matrix indicator for a codebook generated by linear combination, wherein the codebook is generated based on a specific parameter set, and wherein the specific parameter set is differently set/applied based on at least one of a rank value or at least one layer index of a specific rank.

17 Claims, 23 Drawing Sheets

(56) References Cited

U.S. PATENT DOCUMENTS

| | | | | |
|---|---|---|---|---|
| 2019/0372704 | A1* | 12/2019 | Wang | H04L 1/0026 |
| 2020/0008228 | A1* | 1/2020 | Lee | H04L 27/261 |
| 2020/0028555 | A1* | 1/2020 | Rahman | H04B 7/0626 |
| 2020/0235796 | A1* | 7/2020 | Wu | H04B 7/0639 |
| 2020/0244329 | A1* | 7/2020 | Xiao | H04B 7/0478 |
| 2022/0271812 | A1* | 8/2022 | Matsumura | H04B 7/0658 |

FOREIGN PATENT DOCUMENTS

| | | |
|---|---|---|
| CN | 105406911 | 3/2016 |
| CN | 107690756 | 2/2018 |
| JP | 2016192778 | 11/2016 |
| WO | 2013015606 | 1/2013 |

OTHER PUBLICATIONS

R1-1807147, On Type II codebook enhancement, 3GPP TSG RAN WG1 Meeting #93, Busan, Korea, May 21-25, 2018 (Year: 2018).*

PCT International Application No. PCT/KR2019/009408, International Search Report dated Nov. 29, 3 pages.

Huawei et al., "Discussion on Codebook Subset Restriction in Advanced CSI," 3GPP TSG RAN WG1 Meeting #89, R1-1708194, May 2017, 2 pages.

Okia et al., "Remaining details on CSI reporting for Type II and Type I Codebook," 3GPP TSG RAN WG1 Meeting 90bis, R1-1718510, Oct. 2017, 9 pages.

Samsung, "Class A codebook extension and enhancement," 3GPP TSG RAN WG1 Meeting #86b, R1-1609019, Oct. 2016, 6 pages.

European Patent Office Application Serial No. 19841096.1, Search Report dated Jul. 13, 2021, 10 pages.

Samsung, "On higher rank (3 and 4) Type II CSI," 3GPP TSG RAN WG1 Meeting #90, R1-1713592, Aug. 2017, 3 pages.

Samsung et al., "WF on Type I and II CSI codebooks," 3GPP TSG-RAN WG1 #89, R1-1709232, May 2017, 24 pages.

The State Intellectual Property Office of the People's Republic of China Application Serial No. 201980050042.7, Office Action dated Dec. 20, 2022, 10 pages.

* cited by examiner

FIG. 8
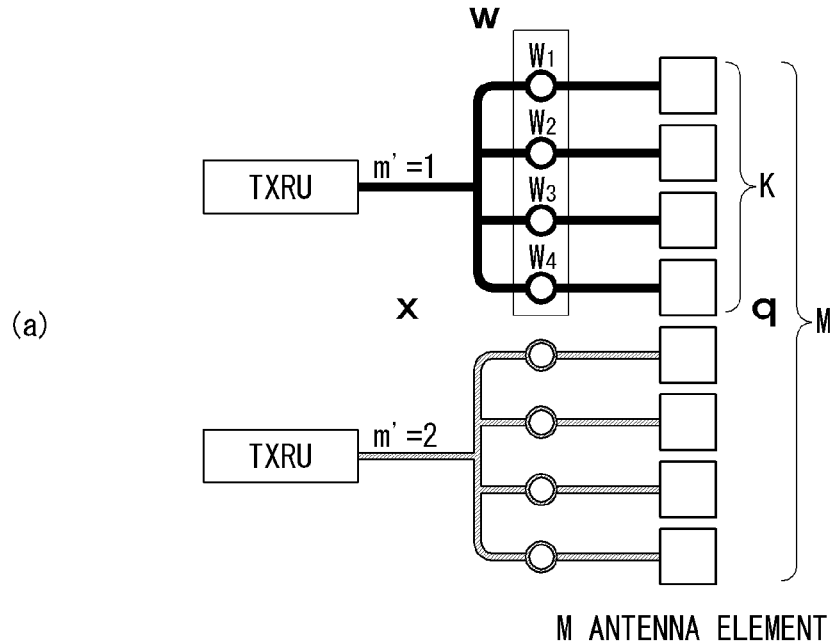
(a)
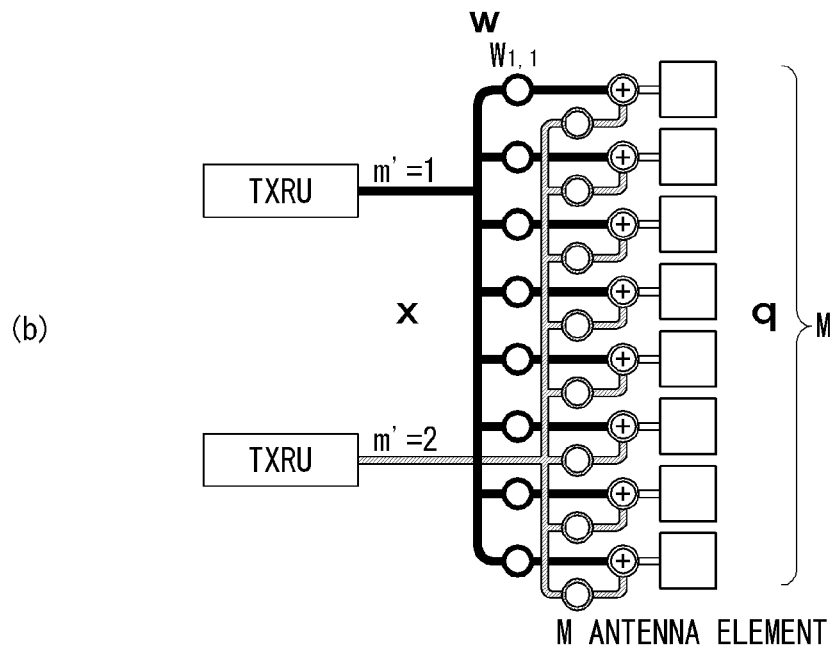
(b)

FIG. 16
16 port CSI-RS

METHOD AND APPARATUS FOR REPORTING CHANNEL STATE INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2019/009408, filed on Jul. 29, 2019, which claims the benefit of earlier filing date and right of priority to Korean Application Nos. 10-2018-0087573, filed on Jul. 27, 2018, and 10-2018-0092829, filed on Aug. 9, 2018, the contents of which are all hereby incorporated by reference herein in their entirety.

TECHNICAL FIELD

The present disclosure relates to a wireless communication system, and more particularly, to a method for transmitting and receiving channel state information in a wireless communication system, and an apparatus therefor.

BACKGROUND ART

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

DISCLOSURE

Technical Problem

The present disclosure provides a method and apparatus for transmitting and receiving a channel status information (CSI)-reference signal (RS) in a wireless communication system.

The present disclosure provides a method and apparatus for setting parameters for generating a codebook in reporting channel state information (CSI) to a base station.

The present disclosure provides a method for reducing a payload size of CSI by reducing parameters included in CSI by setting parameters for generating a codebook.

The present disclosure provides a method for omitting some/all of CSI when there are insufficient resources for reporting CSI in reporting CSI to a base station.

The present disclosure provides a method for ensuring orthogonality between beams in reporting CSI.

Objects of the disclosure are not limited to the foregoing, and other unmentioned objects would be apparent to one of ordinary skill in the art from the following description.

Technical Solution

A method for transmitting channel state information (CSI) by a user equipment (UE) in a wireless communication system includes: receiving a channel state information reference signal (CSI-RS) from a base station through a multiple antenna port; and reporting the CSI to the base station, in which the CSI includes a precoding matrix indicator for a codebook generated by linear combination, the codebook is generated based on a specific parameter set, and the specific parameter set is differently set/applied based on at least one of a rank value or at least one layer index of a specific rank.

The specific parameter set may be differently set/applied based on the rank value.

The specific parameter set may be set differently based on the at least one layer index.

The method may further include: receiving configuration information related to a report of the CSI from the base station, in which the specific parameter set may be included in the configuration information.

The CSI may consist of a first part and a second part, in which the first part may include a rank indicator (RI), a channel quality indicator (CQI), and an indicator indicating the number of combining coefficients having an amplitude of a positive real value, and the second part may include the PMI.

The first part may have a fixed payload size and may be used to identify the number of information bits of the second part.

The method may further include: receiving configuration information related to a report of the CSI from the base station, in which the configuration information may include a plurality of parameter sets for generating the codebook, and the CSI may further include parameter information indicating the specific parameter set used by the UE among the plurality of parameter sets.

The method may further include: receiving resource allocation information related to resource allocation for reporting the CSI from the base station, in which when the size of the allocated resource is smaller than the size of the CSI, the CSI may be omitted in units of subbands until the size of the allocated resource becomes the same.

A method includes transmitting a channel state information reference signal (CSI-RS) to a terminal through a multi-antenna port; and receiving CSI from the terminal, in which the CSI includes a precoding matrix indicator for a codebook generated by linear combination, the codebook is generated based on a specific parameter set, and the specific parameter set is differently set/applied based on at least one of a rank value or at least one layer index of a specific rank.

A terminal includes RF (Radio Frequency) module for transmitting and receiving a radio signal; and a processor for controlling the RF module, in which the processor receives a channel state information reference signal (CSI-RS) from a base station through a multiple antenna port; and reports the CSI to the base station, the CSI includes a precoding matrix indicator for a codebook generated by linear combination, the codebook is generated based on a specific parameter set, and the specific parameter set is differently set/applied based on at least one of a rank value or at least one layer index of a specific rank.

Advantageous Effects

According to an embodiment of the present disclosure, in the CSI reporting, parameters are set according to the rank and/or the number of layers in generating the codebook through the linear combination, thereby reducing the payload size of CSI.

In addition, according to the embodiment of the present disclosure, when the configured resource is insufficient for reporting the CSI, some of the CSI is omitted, thereby enabling the CSI to be reported through the configured resource.

In addition, according to the embodiment of the present disclosure, in reporting the CSI, it is possible to maintain the orthogonality between the beams by applying an orthogonal cover code (OCC) between the layers.

Effects which can be achieved by the present disclosure are not limited to the above-mentioned effects. That is, other objects that are not mentioned may be obviously understood by those skilled in the art to which the present disclosure pertains from the following description.

DESCRIPTION OF DRAWINGS

The accompanying drawings, which are included as part of the detailed description to help understand the present disclosure, provide embodiments of the present disclosure, and describe technical features of the present disclosure together with the detailed description

FIG. 8 is a diagram illustrating a transceiver unit model in the wireless communication system to which the method proposed in the present specification may be applied.

FIG. 16 is a diagram illustrating an example of antenna ports of a CSI-RS to which the methods proposed in the present specification may be applied.

MODE FOR DISCLOSURE

Figure 1:
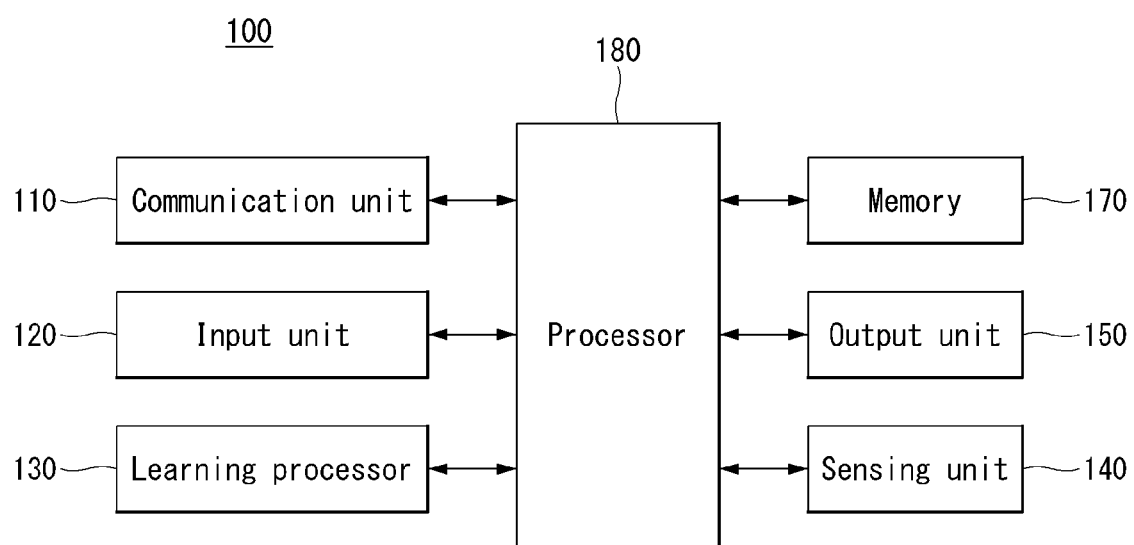
FIG. 1 is a diagram showing an AI device to which the method proposed in the present specification can be applied.

Hereinafter, preferred embodiments according to the present disclosure will be described in detail with reference to the accompanying drawings. The detailed description to be disclosed below with the accompanying drawings is intended to describe exemplary embodiments of the present disclosure, and is not intended to represent only embodiments in which the present disclosure may be practiced. The detailed description below includes specific details to provide a thorough understanding of the present disclosure. However, those skilled in the art appreciates that the present disclosure may be practiced without these specific details.

In some cases, in order to avoid obscuring the concept of the present disclosure, well-known structures and devices may be omitted, or may be illustrated in a block diagram form centering on core capabilities of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

5G new radio (5G NR) defines enhanced mobile broadband (eMBB), massive machine type communications (mMTC), Ultra-Reliable and Low Latency Communications (URLLC), vehicle-to-everything (V2X) according to a usage scenario.

In addition, the 5G NR standard is classified into stand-alone (SA) and non-standalone (NSA) according to co-existence between the NR system and the LTE system.

In addition, the 5G NR supports various subcarrier spacings, and supports CP-OFDM in downlink and CP-OFDM and DFT-s-OFDM (SC-OFDM) in uplink.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A/NR is primarily described for clear description, but technical features of the disclosure are not limited thereto.

In addition, in the present specification, "A and/or B" may be interpreted as the same meaning as "including at least one of A or B".

Hereinafter, an example of 5G usage scenarios to which the method proposed in the present specification may be applied will be described.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 illustrates an AI device 100 according to an embodiment of the disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™ radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

Figure 2:
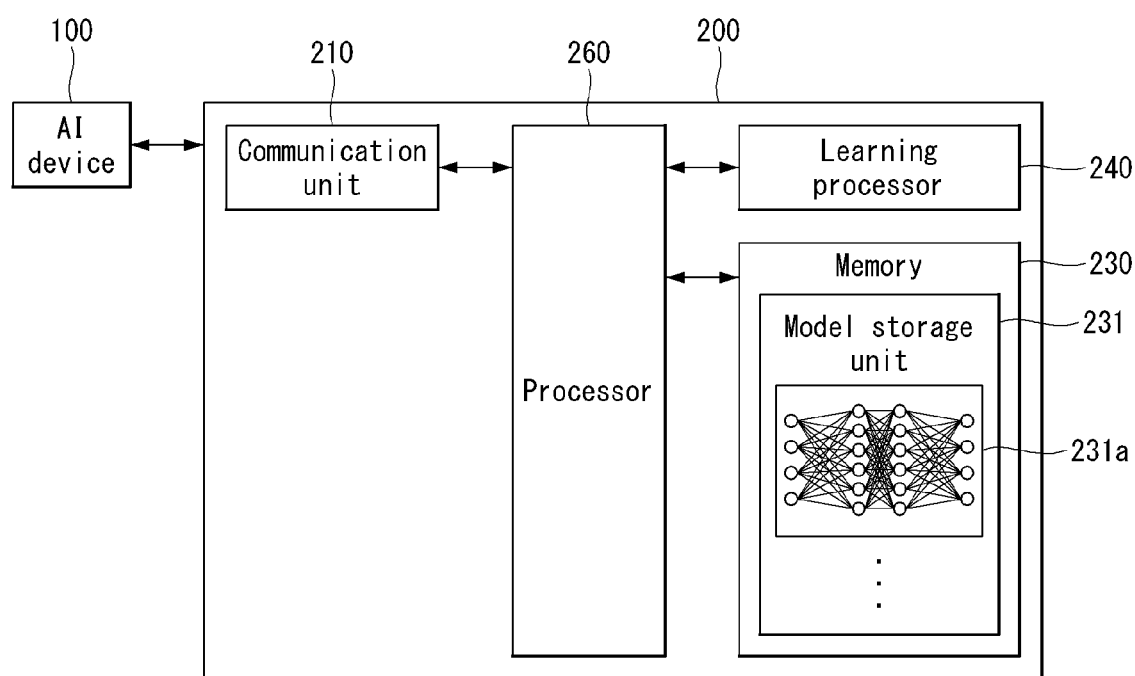
FIG. 2 is a diagram showing an AI server to which the method proposed in the present specification can be applied.

FIG. 2 illustrates an AI server 200 according to an embodiment of the disclosure.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

Figure 3:
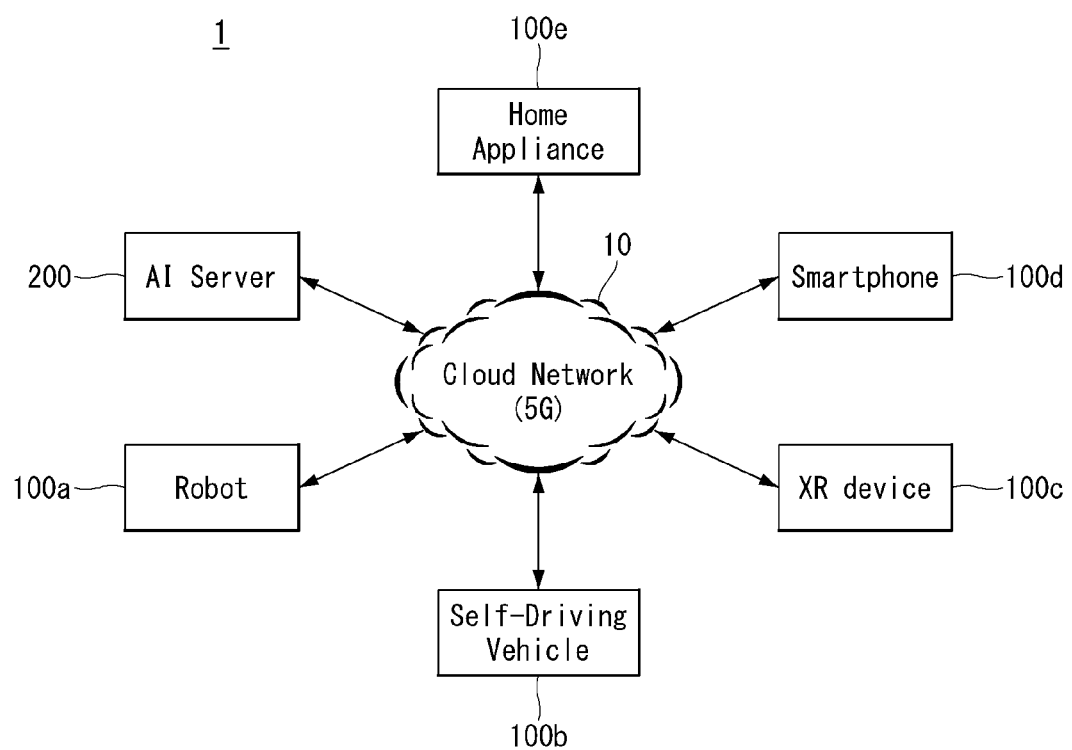
FIG. 3 is a diagram showing an AI system to which the method proposed in the present specification can be applied.

FIG. 3 illustrates an AI system 1 according to an embodiment of the disclosure.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

AI+Robot

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100*a* may use sensor information obtained by at least one sensor among LIDAR, a radar, and a camera in order to determine the moving path and running plan.

The robot 100*a* may perform the above operations using a learning model configured with at least one artificial neural network. For example, the robot 100*a* may recognize a surrounding environment and object using a learning model, and may determine an operation using recognized surrounding environment information or object information. In this case, the learning model may have been directly trained in the robot 100*a* or may have been trained in an external device, such as the AI server 200.

In this case, the robot 100*a* may directly generate results using the learning model and perform an operation, but may perform an operation by transmitting sensor information to an external device, such as the AI server 200, and receiving results generated in response thereto.

The robot 100*a* may determine a moving path and running plan using at least one of map data, object information detected from sensor information, or object information obtained from an external device. The robot 100*a* may run along the determined moving path and running plan by controlling the driving unit.

The map data may include object identification information for various objects disposed in the space in which the robot 100*a* moves. For example, the map data may include object identification information for fixed objects, such as a wall and a door, and movable objects, such as a flowport and a desk. Furthermore, the object identification information may include a name, a type, a distance, a location, etc.

Furthermore, the robot 100*a* may perform an operation or run by controlling the driving unit based on a user's control/interaction. In this case, the robot 100*a* may obtain intention information of an interaction according to a user's behavior or voice speaking, may determine a response based on the obtained intention information, and may perform an operation.

AI+Self-Driving

An AI technology is applied to the self-driving vehicle 100*b*, and the self-driving vehicle 100*b* may be implemented as a movable type robot, a vehicle, an unmanned flight body, etc.

The self-driving vehicle 100*b* may include a self-driving control module for controlling a self-driving function. The self-driving control module may mean a software module or a chip in which a software module has been implemented using hardware. The self-driving control module may be included in the self-driving vehicle 100*b* as an element of the self-driving vehicle 100*b*, but may be configured as separate hardware outside the self-driving vehicle 100*b* and connected to the self-driving vehicle 100*b*.

The self-driving vehicle 100*b* may obtain state information of the self-driving vehicle 100*b*, may detect (recognize) a surrounding environment and object, may generate map data, may determine a moving path and running plan, or may determine an operation using sensor information obtained from various types of sensors.

In this case, in order to determine the moving path and running plan, like the robot 100*a*, the self-driving vehicle 100*b* may use sensor information obtained from at least one sensor among LIDAR, a radar and a camera.

Particularly, the self-driving vehicle 100*b* may recognize an environment or object in an area whose view is blocked or an area of a given distance or more by receiving sensor information for the environment or object from external devices, or may directly receive recognized information for the environment or object from external devices.

The self-driving vehicle 100*b* may perform the above operations using a learning model configured with at least one artificial neural network. For example, the self-driving vehicle 100*b* may recognize a surrounding environment and object using a learning model, and may determine the flow of running using recognized surrounding environment information or object information. In this case, the learning model may have been directly trained in the self-driving vehicle 100*b* or may have been trained in an external device, such as the AI server 200.

In this case, the self-driving vehicle 100*b* may directly generate results using the learning model and perform an operation, but may perform an operation by transmitting sensor information to an external device, such as the AI server 200, and receiving results generated in response thereto.

The self-driving vehicle 100*b* may determine a moving path and running plan using at least one of map data, object information detected from sensor information or object information obtained from an external device. The self-driving vehicle 100*b* may run based on the determined moving path and running plan by controlling the driving unit.

The map data may include object identification information for various objects disposed in the space (e.g., road) in which the self-driving vehicle 100*b* runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100*b* may perform an operation or may run by controlling the driving unit based on a user's control/interaction. In this case, the self-driving vehicle 100*b* may obtain intention information of an interaction according to a user' behavior or voice speaking, may determine a response based on the obtained intention information, and may perform an operation.

AI+XR

An AI technology is applied to the XR device 100*c*, and the XR device 100*c* may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100*c* may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100*c* may output an XR object, including additional information for a recognized object, by making the XR object correspond to the corresponding recognized object.

The XR device 100*c* may perform the above operations using a learning model configured with at least one artificial neural network. For example, the XR device 100*c* may recognize a real object in three-dimensional point cloud data or image data using a learning model, and may provide information corresponding to the recognized real object. In this case, the learning model may have been directly trained in the XR device 100*c* or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI+Robot+Self-Driving

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI+Robot+XR

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

Definition of Terms eLTE eNB: An eLTE eNB is an evolution of an eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 reference points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Numerology: It corresponds to one subcarrier spacing in the frequency domain. By scaling the reference subcarrier spacing to an integer N, different numerology can be defined.

NR: NR Radio Access or New Radio

System General

Figure 4:
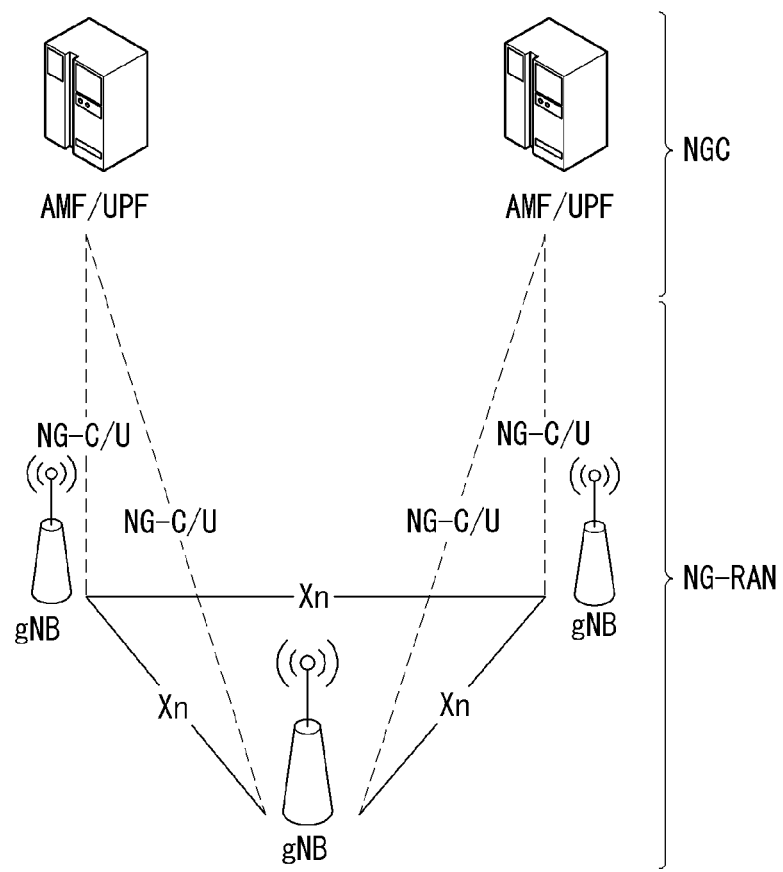
FIG. 4 illustrates an example of an overall structure of a NR system to which a method proposed by the present disclosure is applicable.

FIG. 4 illustrates an example of an overall structure of a new radio (NR) system to which a method proposed by the present specification is applicable.

Referring to FIG. 4, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and Frame Structure

In the NR system, multiple numerologies may be supported. The numerologies may be defined by subcarrier spacing and a cyclic prefix (CP) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s = 1/(\Delta f_{max} \cdot N_f)$, where $\Delta f_{max} = 480 \cdot 10^3$, and $N_f = 4096$. Downlink and uplink transmissions are organized into radio frames with a duration of $T_f = (\Delta f_{max} N_f / 100) \cdot T_s = 10$ ms. The radio frame consists often subframes each having a section of $T_{sf} = (\Delta f_{max} N_f / 1000) \cdot T_s = 1$ ms. In this case, there may be a set of frames in the uplink and a set of frames in the downlink.

Figure 5:
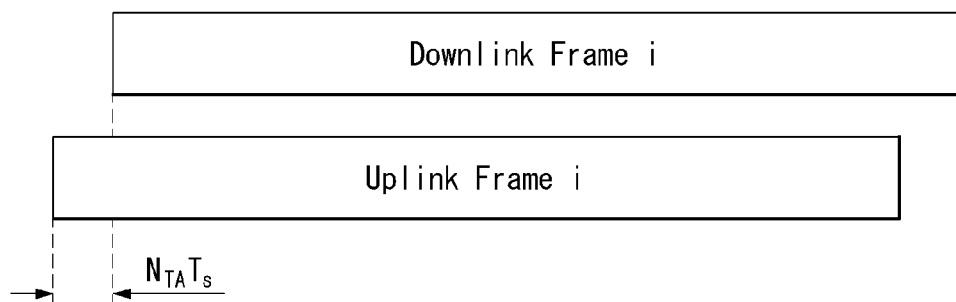
FIG. 5 illustrates a relation between an uplink frame and a downlink frame in a wireless communication system to which a method proposed by the present disclosure is applicable.

FIG. 5 illustrates a relation between a UL frame and a DL frame in a wireless communication system to which a method proposed by the disclosure is applicable.

As illustrated in FIG. 5, a UL frame number i for transmission from a user equipment (UE) shall start $T_{TA} = N_{TA} T_s$ before the start of a corresponding downlink frame at the corresponding UE.

Regarding the numerology μ, slots are numbered in increasing order of $n_s^\mu \in \{0, \ldots, N_{subframe}^{slots, \mu} - 1\}$ within a subframe, and are numbered in increasing order of $n_{s,f}^\mu \in \{0, \ldots, N_{frame}^{slots, \mu} - 1\}$ within a radio frame. One slot consists of consecutive OFDM symbols of $N_{symb}^\mu$, and $N_{symb}^\mu$ is determined depending on a numerology in use and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 represents the number of OFDM symbols $N_{symb}^{slot}$ per slot in a normal CP, the number of slot $N_{slot}^{frame, \mu}$ per radio frame and the number of slot $N_{slot}^{subframe, \mu}$ per subframe, and Table 3 represents the number of OFDM symbols in an extended CP, the number of slot per radio frame and the number of slot per subframe.

TABLE 2

| | | | Slot configuration | | | |
|---|---|---|---|---|---|---|
| | | 0 | | | 1 | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 6:
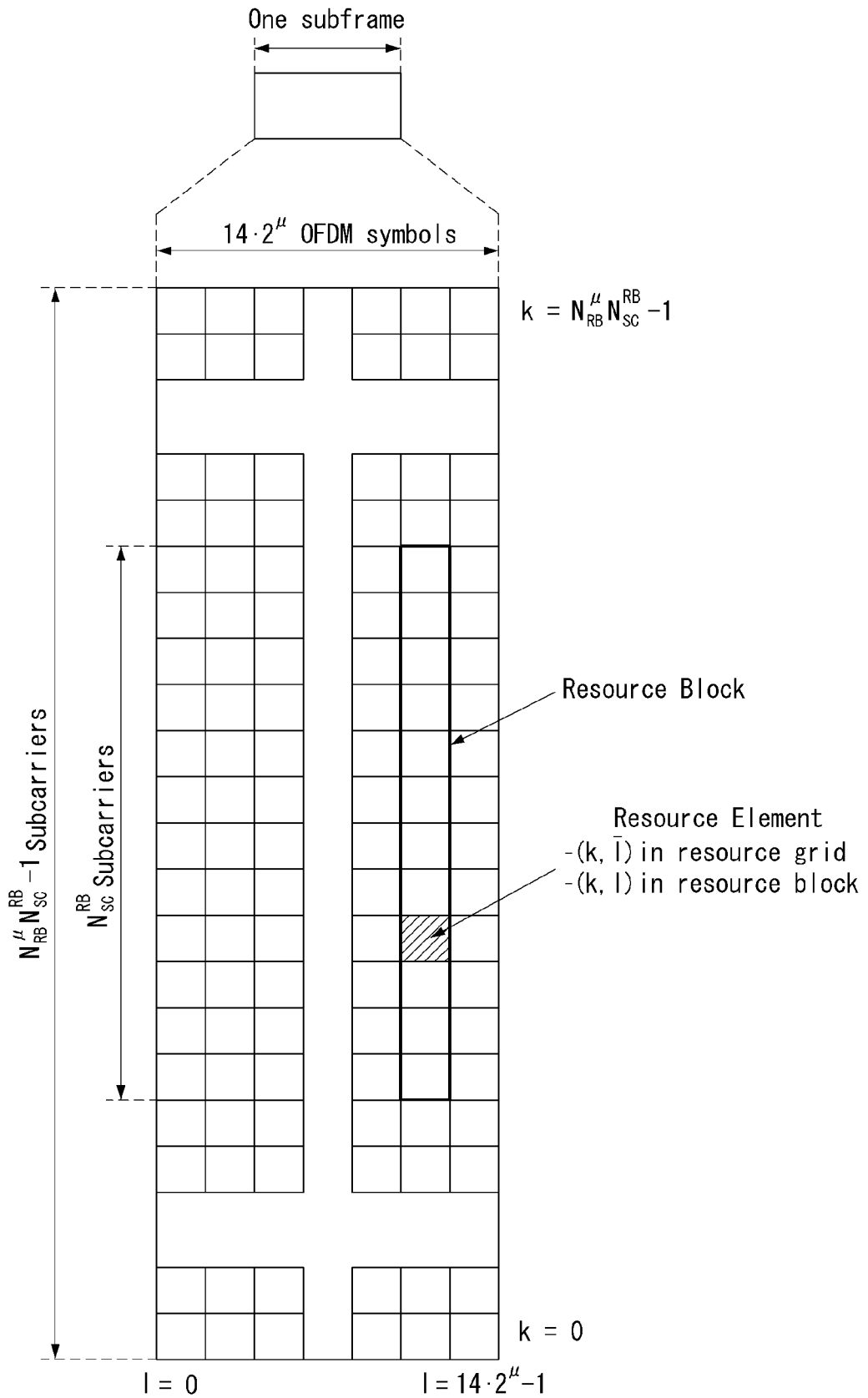
FIG. 6 illustrates an example of a resource grid supported in a wireless communication system to which a method proposed by the present disclosure is applicable.

FIG. 6 illustrates an example of a resource grid supported in a wireless communication system to which a method proposed by the disclosure may be applied.

Referring to FIG. 6, a resource grid is composed of $N_{RB}^{\mu} N_{sc}^{RB}$ subcarriers in a frequency domain, each subframe composed of 14·2μOFDM symbols, but the disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, one resource grid may be configured for the numerology μ and an antenna port p.

Each element of the resource grid for the numerology μ and the antenna port p is indicated as a resource element, and may be uniquely identified by an index pair (k,l̄). Herein, k=0, ..., $N_{RB}^{\mu} N_{sc}^{RB}-1$ is an index in the frequency domain, and l̄=0, ..., $2^{\mu} N_{symb}^{(\mu)}-1$ indicates a location of a symbol in a subframe. To indicate a resource element in a slot, the index pair (k,l̄) is used. Herein, l=0, ..., $N_{symb}^{\mu}-1$.

The resource element (k,l̄) for the numerology μ and the antenna port p corresponds to a complex value $\alpha_{k,l̄}^{(p,\mu)}$. When there is no risk of confusion or when a specific antenna port or numerology is specified, the indexes p and μ may be dropped and thereby the complex value may become $\alpha_{k,l̄}^{(p)}$ or $\alpha_{k,l̄}$.

In addition, a physical resource block is defined as $N_{sc}^{RB}=12$ continuous subcarriers in the frequency domain. In the frequency domain, physical resource blocks may be numbered from 0 to $N_{RB}^{\mu}=1$. At this point, a relationship between the physical resource block number $n_{PRB}$ and the resource elements (k, l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Subframe Structure

Figure 7:
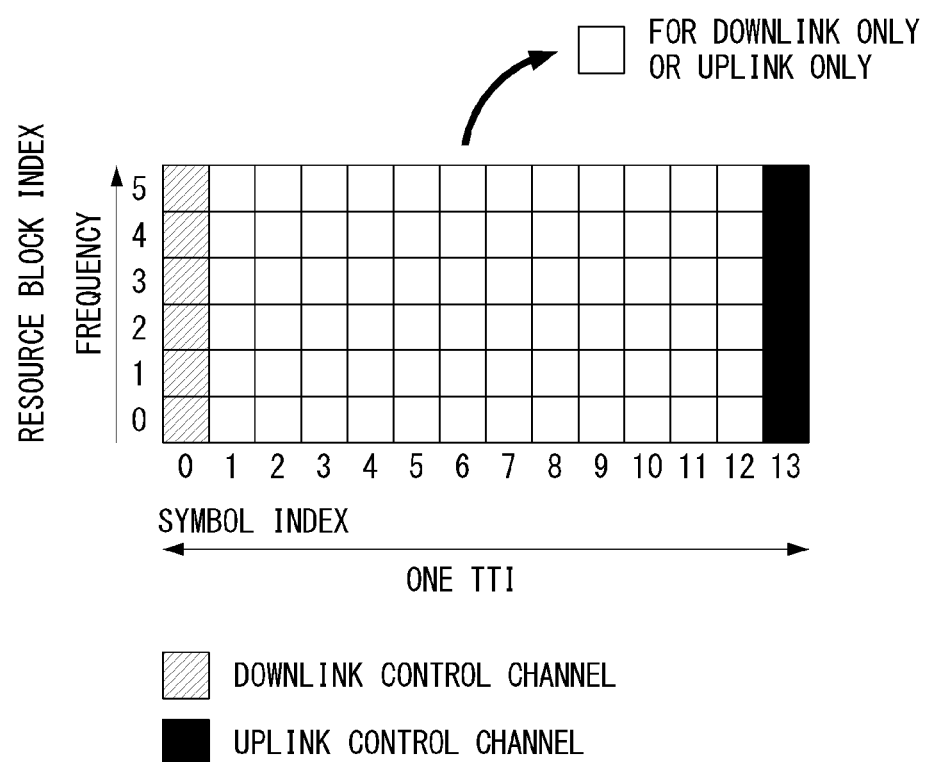
FIG. 7 is a diagram illustrating a self-contained subframe structure in the wireless communication system to which the method proposed in the present specification may be applied.

FIG. 7 is a diagram illustrating a self-contained subframe structure in the wireless communication system to which the present disclosure may be applied.

In order to minimize data transmission latency in the TDD system, 5 generation (5G) new RAT considers a self-contained subframe structure as illustrated in FIG. 4.

In FIG. 7, a hatched area (symbol index 0) indicates a downlink (DL) control area, and a black area (symbol index 13) indicates an uplink (UL) control area. An area without a shaded mark may be used for DL data transmission or UL data transmission. The characteristic of this structure is that DL transmission and UL transmission are sequentially performed in one subframe, and thus DL data is transmitted within a subframe, and UL ACK/NACK may also be received. As a result, when a data transmission error occurs, the time required to retransmit data is reduced, thereby minimizing the latency of the final data transmission.

In this self-contained subframe structure, a time gap is required for a process of switching from a transmission mode to a reception mode or a process of switching from a reception mode to a transmission mode by the base station and the UE. To this end, some OFDM symbols at a switching time from DL to UL in the self-contained subframe structure are configured as a guard period (GP).

Analog Beamforming

In the millimeter wave (mmW), a wavelength is shortened, so a plurality of antenna elements can be installed in the same area. That is, in the 30 GHz band, a wavelength is 1 cm, and a total of 64 (8×8) antenna elements can be installed on a 4□4 cm panel in a 2-dimensional array with 0.5 lambda (i.e., wavelength) intervals. Therefore, in the mmW, the plurality of antenna elements are used to increase a beamforming (BF) gain, thereby increasing coverage or throughput.

In this case, by providing a transceiver unit (TXRU) so that the transmission power and phase can be adjusted for each antenna element, independent beamforming is possible for each frequency resource. However, the installation of the TXRU on all 100 antenna elements causes a problem of ineffectiveness in terms of price. Therefore, a method for mapping a plurality of antenna elements to one TXRU and adjusting a beam direction with an analog phase shifter is considered. This analog BF method has a disadvantage in that it can make only one beam direction in all bands and thus cannot perform frequency selective beaming.

It is possible to consider hybrid BF having B TXRUs, which is an intermediate form between digital BF and analog BF and is a smaller number than the number of Q antenna elements. In this case, although there are differences depending on a connection method between the B TXRUs and the Q antenna elements, the direction of beams that can be simultaneously transmitted is limited to B or less.

Hereinafter, representative examples of the connection method between the TXRU and the antenna element will be described with reference to the drawings.

FIG. 8 is a diagram illustrating a transceiver unit model in the wireless communication system to which the present disclosure may be applied.

The TXRU virtualization model represents the relationship between the output signal of the TXRU and the output signal of the antenna elements. Depending on the correlation between the antenna element and the TXRU, the TXRU virtualization model may be classified into TXRU virtualization model option-1 as illustrated in FIG. 8(*a*): a sub-array partition model and a TXRU virtualization model option-2 as illustrated in FIG. 8(b): a full-connection model.

Referring to FIG. 8(*a*), in the case of the sub-array partition model, the antenna element is divided into multiple antenna element groups, and each TXRU is connected to one of the groups. In this case, the antenna element is connected to only one TXRU.

Referring to FIG. 8(*b*), in the case of the full-connection model, signals of multiple TXRUs are combined and transmitted to a single antenna element (or array of antenna elements). That is, this indicates a method in which TXRU is connected to all antenna elements. In this case, the antenna element is connected to all the TXRUs.

In FIG. 8, q is a transmission signal vector of M antenna elements having the same polarization (co-polarized) in one column. w indicates a wideband TXRU virtualization weight vector, and W indicates a phase vector multiplied by an analog phase shifter. That is, the direction of the analog beamforming is determined by W. x is a signal vector of M_TXRU TXRUs.

Here, the mapping between the antenna port and the TXRUs may be one-to-one or one-to-many.

In FIG. 8, the TXRU-to-element mapping is just an example, and the present disclosure is not limited thereto, and the present disclosure may be equally applied to the TXRU-to-element mapping that may be implemented in other various forms from a hardware perspective.

In addition, in the New RAT system, when multiple antennas are used, a hybrid beamforming technique of combining the digital beamforming and the analog beamforming has emerged. In this case, the analog beamforming (or radio frequency (RF) beamforming) refers to an operation of performing precoding (or combining) at the RF stage. In the hybrid beamforming, the baseband stage and the RF stage each perform the precoding (or combining), thereby achieving the performance close to that of the digital beamforming while reducing the number of RF chains and the number of D(digital)/A(analog) (or A/D) converters. For convenience, the hybrid beamforming structure may be expressed by N transceiver units (TXRU) and M physical antennas. Then, after the digital beamforming for L data layers to be transmitted from the transmitting end may be expressed by N by L matrix, the analog beamforming in which the converted N digital signals are converted to analog signals through the TXRU and then represented by an M by N matrix is applied.

Figure 9:
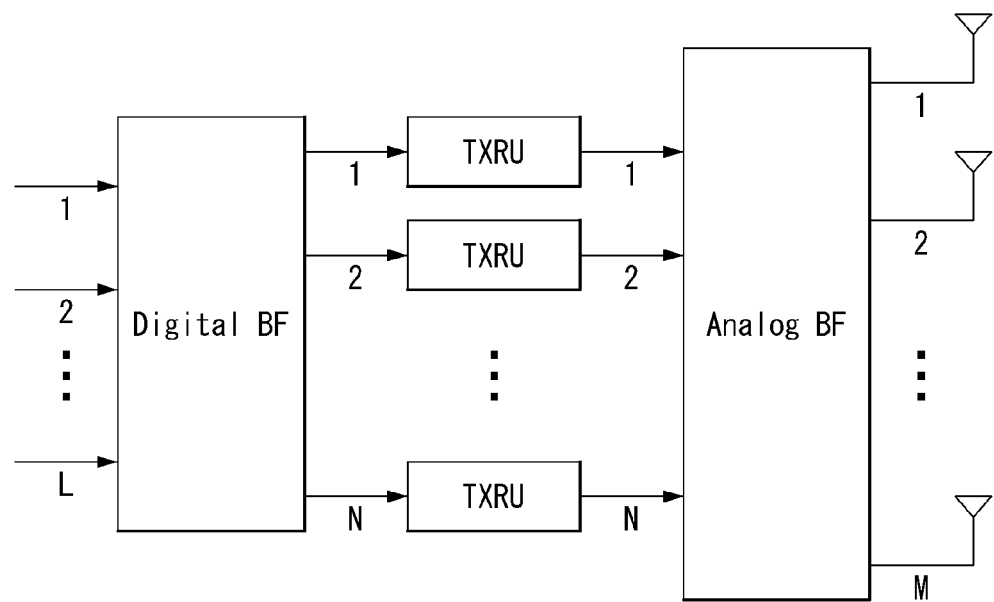
FIG. 9 is a diagram illustrating a hybrid beamforming structure in terms of TXRU and a physical antenna in the wireless communication system to which the method proposed in the present specification may be applied.

FIG. 9 is a diagram illustrating a hybrid beamforming structure in terms of TXRU and a physical antenna in the wireless communication system to which the present disclosure may be applied.

FIG. 9 illustrates a case where the number of digital beams is L and the number of analog beams is N.

In the New RAT system, a way to support more efficient beamforming to a terminal located in a specific area by designing a base station to change analog beamforming in units of symbols is being considered. Furthermore, when defining specific N TXRUs and M RF antennas as one antenna panel in FIG. 6, in the New RAT system, a method for introducing a plurality of antenna panels capable of applying hybrid beamforming independently of each other is being considered.

Channel State Information (CSI) Feedback

In the 3GPP LTE/LTE-A system, a user equipment (UE) is defined to report channel state information (CSI) to a base station (BS or eNB).

The CSI collectively refers to information that may indicate the quality of a radio channel (or referred to as a link) formed between the UE and the antenna port. The CSI may include, for example, a rank indicator (RI), a precoding matrix indicator (PMI), a channel quality indicator (CQI), and the like.

Here, R1 represents the rank information of the channel, which means the number of streams that the UE receives through the same time-frequency resource. This value is dependently determined by the long term fading of the channel, and therefore is fed back from the UE to the BS with a generally longer period than PMI and CQI. The PMI is a value reflecting channel spatial characteristics and indicates a precoding index preferred by the UE based on a metric such as a signal-to-interference-plus-noise ratio (SINR). The CQI is a value indicating the strength of a channel and generally means the received SINR that may be obtained when the BS uses the PMI.

In the 3GPP LTE/LTE-A system, the base station sets a plurality of CSI processes in the UE, and may receive a CSI report for each process. Here, the CSI process consists of a CSI-RS for signal quality measurement from a base station and a CSI-Interference Measurement (CSI-IM) resource for interference measurement.

Reference Signal (RS) Virtualization

PDSCH can be transmitted in only one analog beam direction at a time by analog beamforming in mmW. In this case, data transmission is possible from the base station only to a few UEs in the corresponding direction. Therefore, if necessary, by setting the analog beam direction differently for each antenna port, data transmission may be performed simultaneously to a plurality of UEs in various analog beam directions.

Figure 10:
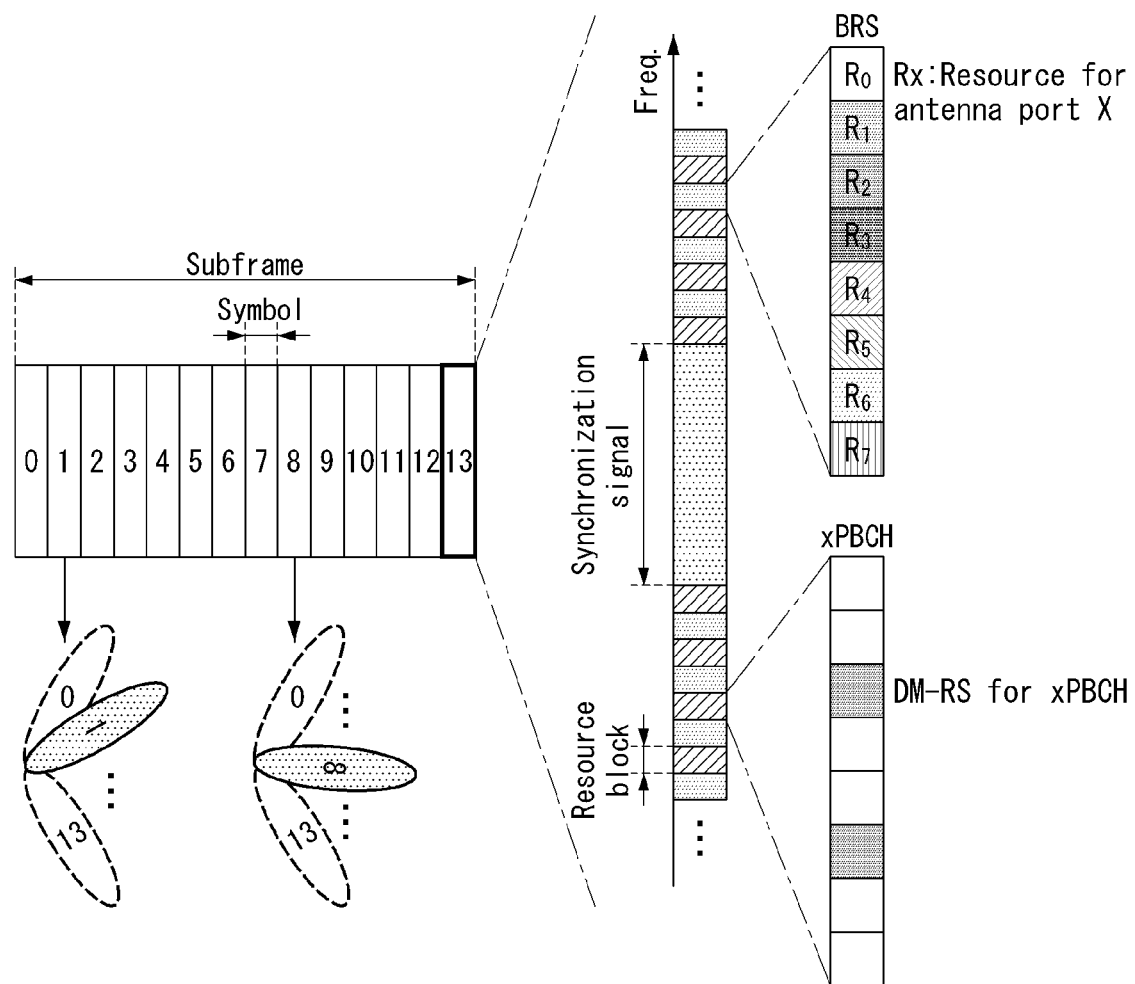
FIG. 10 is a diagram illustrating an example of a beam sweeping operation to which the method proposed in the present specification may be applied.

FIG. 10 is a diagram illustrating an example of a beam sweeping operation to which the method proposed in the present specification may be applied.

As described in FIG. 10, when the base station uses a plurality of analog beams, since analog beams advantageous for signal reception may be different for each terminal, for at least a synchronization signal, system information, paging, and the like, a beam sweeping operation that allows all terminals to have a reception opportunity by changing a plurality of analog beams to be applied by the base station in a specific subframe according to symbols is being considered, FIG. 10 illustrates an example of a beam sweeping operation for the synchronization signal and the system information in the downlink transmission process. In FIG. 10, a physical resource (or physical channel) through which system information is transmitted in a broadcasting method in the New RAT is referred to as xPBCH (physical broadcast channel).

At this time, analog beams belonging to different antenna panels within one symbol may be simultaneously transmitted, and to measure a channel according to the analog beam, a method for introducing a beam reference signal (BRS) which is a reference signal transmitted by applying a single analog beam (corresponding to a specific antenna panel) as illustrated in FIG. 7 is being discussed.

The BRS may be defined for a plurality of antenna ports, and each antenna port of the BRS may correspond to a single analog beam.

In this case, unlike the BRS, the synchronization signal or the xPBCH may be transmitted by applying all analog beams in the analog beam group so that signals transmitted by arbitrary terminals may be well received.

RRM Measurement

In the LTE system, RRM operations including Power control, Scheduling, Cell search, Cell reselection, Handover, Radio link or Connection monitoring, and Connection establish/re-establish, and the like are supported.

In this case, the serving cell may request RRM measurement information, which is a measurement value for performing an RRM operation, from the UE.

For example, the terminal may measure information such as cell search information, reference signal received power (RSRP), and reference signal received quality (RSRQ) for each cell and report the measured information to the base station.

Specifically, in the LTE system, the terminal receives 'measConfig' as a higher layer signal for RRM measurement from the Serving Cell. The terminal measures RSRP or RSRQ according to 'measConfig'.

The definitions of RSRP, RSRQ and RSSI are as follows.

RSRP: RSRP may be defined as a linear average of power contribution ([W]) of a resource element carrying a cell-specific reference signal within the considered measurement frequency bandwidth. A cell-specific reference signal R0 may be used for RSRP determination. When the terminal may reliably detect that R1 is available, the RSRP may be determined using R1 in addition to R0.

The RSRP reference point may be an antenna connector of the terminal.

When receiver diversity is used by the terminal, the reported value should not be lower than the corresponding RSRP of any individual diversity branch.

RSRQ: The reference signal reception quality (RSRQ) is defined as the ratio N×RSRP/(E-UTRA carrier RSSI), where N is the number of RBs of the E-UTRA carrier RSSI measurement bandwidth. Measurements of numerator and denominator needs to be performed through the same set of resource blocks.

The E-UTRA carrier received signal strength indicator (RSSI) is received by a block by the UE from all sources that include the linear average of the total received power ([W]) measured only in the OFDM symbol including the reference symbol for antenna port 0 and include N resources adjacent channel interference, thermal noise, etc., in the measurement bandwidth.

When the higher layer signaling indicates a specific subframe for performing RSRQ measurement, the RSSI is measured for all OFDM symbols in the indicated subframe.

The reference point for the RSRQ should be the antenna connector of the terminal.

When the receiver diversity is used by the terminal, the reported value should not be lower than the corresponding RSRP of any individual diversity branch.

RSSI: RSSI refers to the received broadband power including thermal noise and noise generated by the receiver within the bandwidth defined by the receiver pulse shaping filter.

The reference point for measuring the RSSI should be the antenna connector of the terminal. When the receiver diversity is used by the terminal, the reported value should not be lower than the corresponding UTRA carrier RSSI of any individual reception antenna branch.

According to this definition, the UE operating in the LTE system may measure the RSRP in the bandwidth corresponding to one of 6, 15, 25, 50, 75, and 100RB (resource block) through an Allowed measurement bandwidth related information element (IE) transmitted in system information block type 3 (SIB3) in the case of the Intra-frequency measurement and through an Allowed measurement bandwidth transmitted in SIB5 in the case of Inter-frequency measurement.

Alternatively, in the absence of the above IE, the measurement may be performed in the frequency band of the entire downlink (DL) system by default. In this case, when the terminal receives the Allowed measurement bandwidth, the terminal considers the value as the maximum measurement bandwidth and may freely measure the value of the RSRP within the corresponding value.

However, if the Serving Cell transmits the IE defined as WB-RSRQ, and the Allowed measurement bandwidth is set to 50RB or more, the terminal needs to compute the RSRP value for the total allowed measurement bandwidth. Meanwhile, for the RSSI, measurement may be performed in a frequency band of the receiver of the terminal according to the definition of the RSSI bandwidth.

Figure 11:
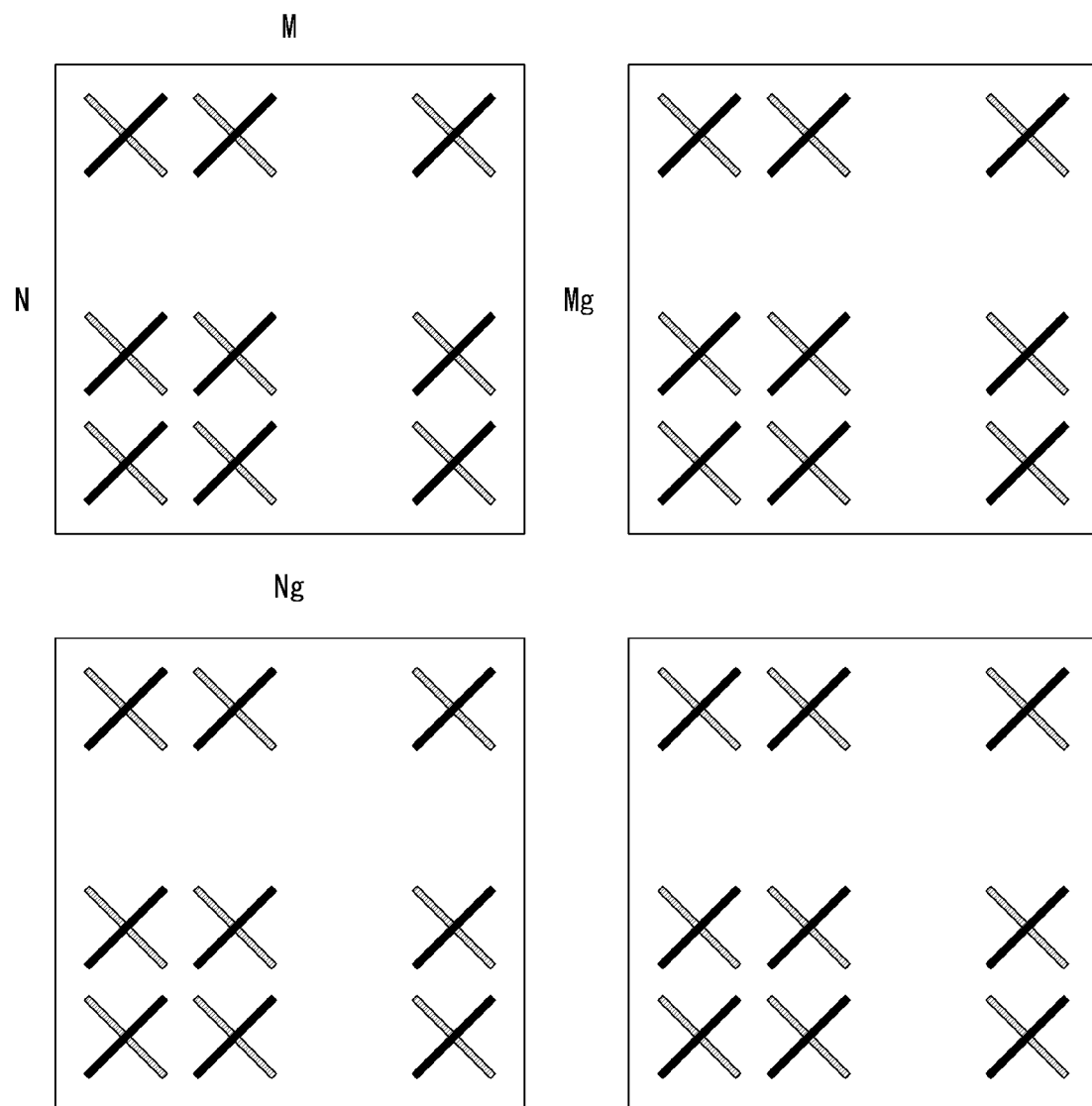
FIG. 11 is a diagram illustrating an example of an antenna array to which the method proposed in the present specification may be applied.

FIG. 11 is a diagram illustrating an example of an antenna array to which the method proposed in the present specification may be applied.

The panel antenna array generalized in FIG. 11 may be composed of Mg and Ng panels in a horizontal domain and a vertical domain, respectively.

At this time, one panel is composed of M columns and N rows, respectively, and in FIG. 11, an X-pol antenna is assumed. Accordingly, the total number of antenna elements may be 2*M*N*Mg*Ng.

Channel State Information Related Procedure

Figure 12:
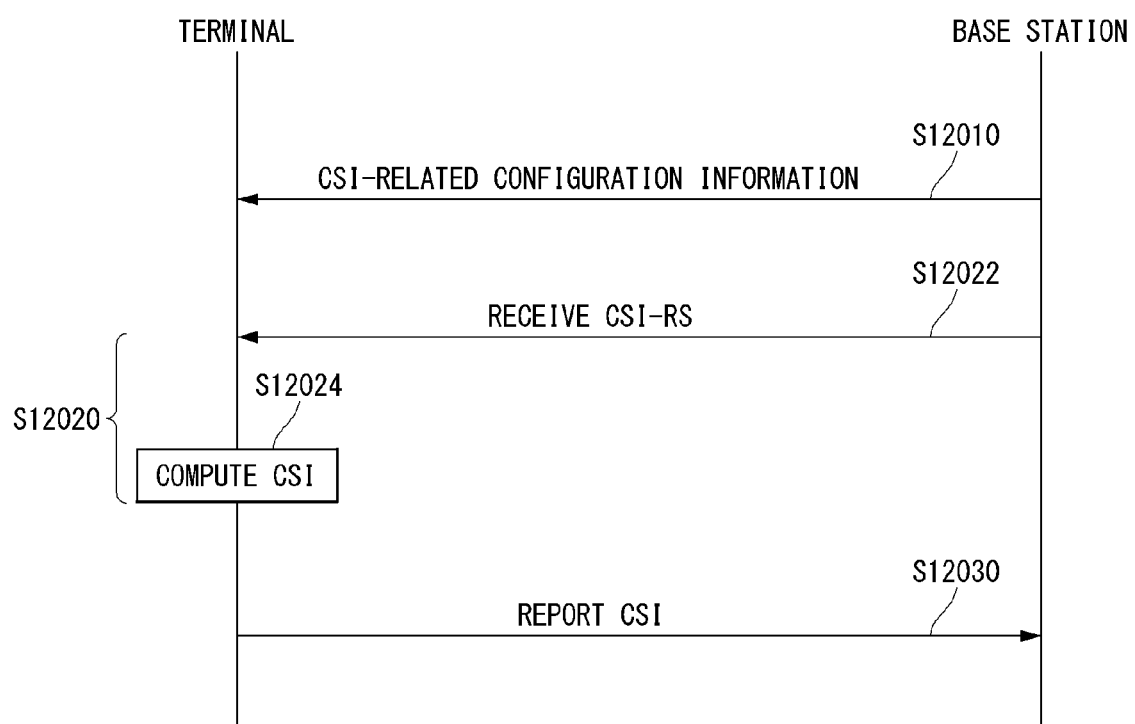
FIG. 12 is a flowchart illustrating an example of a CSI-related procedure to which the method proposed in the present specification can be applied.

FIG. 12 is a flowchart illustrating an example of a CSI-related procedure to which the method proposed in the present specification can be applied.

In the NR (New Radio) system, the channel state information-reference signal (CSI-RS) is used for time and/or frequency tracking, CSI computation, L1 (layer 1)-RSRP (reference signal received power) and mobility.

In the present specification, "A and/or B" may be interpreted as the same meaning as "including at least one of A or B".

The CSI computation is related to CSI acquisition, and the L1-RSRP computation is related to beam management (BM).

The CSI collectively refers to information that may indicate the quality of a radio channel (or referred to as a link) formed between the UE and the antenna port.

In order to perform one of the uses of the CSI-RS as described above, the terminal (for example, user equipment, UE) transmits configuration information related to CSI to the base station (for example, general Node B, gNB) through radio resource control (RRC) signaling (S12010).

The configuration information related to the CSI may include at least one of CSI-IM (interference management) resource related information, CSI measurement configuration related information, CSI resource configuration related information, CSI-RS resource related information, CSI-RS resource related information, or CSI report configuration related information.

The CSI-IM resource related information may include CSI-IM resource information, CSI-IM resource set information, and the like.

The CSI-IM resource set is identified by a CSI-IM resource set ID (identifier), and one resource set includes at least one CSI-IM resource.

Each CSI-IM resource is identified by a CSI-IM resource ID.

The CSI resource configuration related information defines a group including at least one of a non zero power (NZP) CSI-RS resource set, a CSI-IM resource set, or a CSI-SSB resource set.

That is, the CSI resource configuration related information may include a CSI-RS resource set list, and the CSI-RS resource set list may include at least one of the NZP CSI-RS resource set list, the CSI-IM resource set list, or the CSI-SSB resource set list.

The CSI resource configuration related information may be expressed as CSI-ResourceConfig IE.

The CSI-IM resource set is identified by a CSI-IM resource set ID (identifier), and one resource set includes at least one CSI-IM resource.

Each CSI-IM resource is identified by a CSI-RS resource ID.

As shown in Table 1, parameters (for example, a BM related "repetition" parameter, a tracking related "trs-Info" parameter) indicating the use of CSI-RS for each NZP CSI-RS resource set may be set.

Table 4 shows an example of the NZP CSI-RS resource set IE.

TABLE 4

```
-- ASN1START
-- TAG-NZP-CSI-RS-RESOURCESET-START
NZP-CSI-RS-ResourceSet ::=      SEQUENCE {
  nzp-CSI-ResourceSetId         NZP-CSI-RS-ResourceSetId,
  nzp-CSI-RS-Resources          SEQUENCE (SIZE (1..maxNrofNZP-
CSI-RS-ResourcesPerSet)) OF NZP-CSI-RS-ResourceId,
```

TABLE 4-continued

| | |
|---|---|
| repetition | ENUMERATED { on, off } OPTIONAL, |
| aperiodicTriggeringOffset | INTEGER(0..4) OPTIONAL, -- Need S |
| trs-Info | ENUMERATED {true} OPTIONAL, -- Need R |

```
   . . .
}
-- TAG-NZP-CSI-RS-RESOURCESET-STOP
-- ASN1STOP
```

In Table 4, the repetition parameter is a parameter indicating whether the same beam is repeatedly transmitted, and indicates whether repetition is 'ON' or 'OFF' for each NZP CSI-RS resource set.

The transmission beam (Tx beam) used in the present specification may be interpreted as the same meaning as a spatial domain transmission filter, and the reception beam (Rx beam) may be interpreted as the same meaning as a spatial domain reception filter.

For example, when the repetition parameter of Table 4 is set to 'OFF', the terminal does not assume that the NZP CSI-RS resource(s) in the resource set are transmitted in the same DL spatial domain transmission filter and the same Nrofports in all symbols.

The repetition parameter corresponding to the higher layer parameter corresponds to the 'CSI-RS-ResourceRep' of the L1 parameter.

The CSI report configuration related information includes a report ConfigType parameter indicating a time domain behavior and a reportQuantity parameter indicating a CSI related quantity for reporting.

The time domain behavior may be periodic, aperiodic or semi-persistent.

In addition, the CSI report configuration related information may be expressed as CSI-ReportConfig IE, and Table 5 below shows an example of the CSI-ReportConfig IE.

TABLE 5

```
-- ASN1START
-- TAG-CSI-RESOURCECONFIG-START
CSI-ReportConfig ::=            SEQUENCE {
  reportConfigId                CSI-ReportConfigId,
  carrier                       ServCellIndex           OPTIONAL,
  -- Need S
  resourcesForChannelMeasurement    CSI-ResourceConfigId,
  csi-IM-ResourcesForInterference   CSI-ResourceConfigId    OPTIONAL,
  -- Need R
  nzp-CSI-RS-ResourcesForInterference   CSI-ResourceConfigId    OPTIONAL,
  -- Need R
  reportConfigType              CHOICE {
    periodic                    SEQUENCE {
      reportSlotConfig          CSI-ReportPeriodicityAndOffset,
      pucch-CSI-ResourceList      SEQUENCE (SIZE
(1..maxNrofBWPs)) OF PUCCH-CSI-Resource
    },
    semiPersistentOnPUCCH       SEQUENCE {
      reportSlotConfig          CSI-ReportPeriodicityAndOffset,
      pucch-CSI-ResourceList      SEQUENCE (SIZE
(1..maxNrofBWPs)) OF PUCCH-CSI-Resource
    },
    semiPersistentOnPUSCH       SEQUENCE {
      reportSlotConfig          ENUMERATED {sl5, sl10, sl20, sl40,
sl80, sl160, sl320},
      reportSlotOffsetList        SEQUENCE (SIZE (1.. maxNrofUL-
Allocations)) OF INTEGER(0..32),
      p0alpha                   P0-PUSCH-AlphaSetId
    },
    aperiodic                   SEQUENCE {
      reportSlotOffsetList        SEQUENCE (SIZE (1..maxNrofUL-
Allocations)) OF INTEGER(0..32)
    }
```

TABLE 5-continued

```
},
reportQuantity                    CHOICE {
    none                              NULL,
    cri-RI-PMI-CQI                    NULL,
    cri-RI-i1                         NULL,
    cri-RI-i1-CQI                     SEQUENCE {
        pdsch-BundleSizeForCSI            ENUMERATED {n2, n4}
OPTIONAL
    },
    cri-RI-CQI                        NULL,
    cri-RSRP                          NULL,
    ssb-Index-RSRP                     NULL,
    cri-RI-LI-PMI-CQI                 NULL
},
```

In addition, the terminal measures the CSI based on the CSI related configuration information (S12020).

The CSI measurement may include (1) the CSI-RS reception process of the terminal (S12022), and (2) a process of computing the CSI through the received CSI-RS (S12024).

The sequence for the CSI-RS is generated by Equation 2 below, and the initialization value of the pseudo-random sequence C(i) is defined by Equation 3.

$$r(m) = \frac{1}{\sqrt{2}}(1 - 2 \cdot c(2m)) + j\frac{1}{\sqrt{2}}(1 - 2 \cdot c(2m+1))$$ [Equation 2]

$$c_{init} = \left(2^{10}\left(N_{symb}^{slot}n_{s,f}^{\mu} + l + 1\right)(2n_{ID} + 1) + n_{ID}\right) \bmod 2^{31}$$ [Equation 3]

In Equations 2 and 3, $n_{s,f}^{\mu}$ represents a slot number in a radio frame, and a pseudo-random sequence generator is initialized to $C_{int}$ at the beginning of each OFDM symbol which is $n_{s,f}^{\mu}$.

l is the OFDM symbol number in the slot, and $n_{ID}$ is the same as the higher-layer parameter scramblingID.

In addition, in the CSI-RS, the RE (resource element) mapping of the CSI-RS resource is set in the time and frequency domains by the higher layer parameter CSI-RS-ResourceMapping.

Table 6 shows an example of CSI-RS-ResourceMapping IE.

TABLE 6

```
-- ASN1START
-- TAG-CSI-RS-RESOURCEMAPPING-START
CSI-RS-ResourceMapping ::=         SEQUENCE {
    frequencyDomainAllocation          CHOICE {
        row1                               BIT STRING (SIZE (4)),
        row2                               BIT STRING (SIZE (12)),
        row4                               BIT STRING (SIZE (3)),
        other                              BIT STRING (SIZE (6))
    },
    nrofPorts                          ENUMERATED {p1,p2,p4,p8,p12,p16,p24,p32},
    firstOFDMSymbolInTimeDomain            INTEGER (0..13),
    firstOFDMSymbolInTimeDomain2       INTEGER (2..12)
                                       OPTIONAL, -- Need R
    cdm-Type                           ENUMERATED {noCDM, fd-CDM2, cdm4-FD2-
TD2, cdm8-FD2-TD4},
    density                            CHOICE {
        dot5                               ENUMERATED {evenPRBs, oddPRBs},
        one                                NULL,
        three                              NULL,
        spare                              NULL
    },
    freqBand                           CSI-FrequencyOccupation,
    . . .
}
```

In Table 6, the density D represents the density of the CSI-RS resource measured in RE/port/PRB (physical resource block), and nrofPorts represents the number of antenna ports.

The terminal reports the measured CSI to the base station (S12030).

Here, when the quantity of CSI-ReportConfig in Table 6 is set to 'none (or No report)', the terminal may omit the report.

However, even when the quantity is set to 'none (or No report)', the terminal may perform the report to the base station.

The case in which the quantity is set to 'none' may be the case in which the aperiodic TRS is triggered or the case in which the repetition is set.

Here, it may be defined to omit the report of the terminal only when the repetition is set to 'ON'.

In summary, when the repetition is set to 'ON' and 'OFF', as the CSI report, 'No report', 'SSB Resource Indicator (SSBRI) and L1-RSRP', and 'CSI-RS Resource Indicator (CRI) and L1-RSRP' can all be possible.

Alternatively, when the repetition is 'OFF', the CSI report of 'SSBRI and L1-RSRP' or 'CRI and L1-RSRP' is defined to be transmitted, and when the repetition is 'ON', 'No report', 'SSBRI and L1-RSRP', or 'CRI and L1-RSRP' may be defined to be transmitted.

CSI Measurement and Reporting Procedure

The NR system supports more flexible and dynamic CSI measurement and reporting.

The CSI measurement may include a procedure of acquiring CSI by receiving a CSI-RS and computing the received CSI-RS.

As the time domain behavior of CSI measurement and reporting, aperiodic/semi-persistent/periodic channel measurement (CM) and interference measurement (IM) are supported.

For the configuration of the CSI-IM, a 4 port NZP CSI-RS RE pattern is used.

CSI-IM-based IMR of the NR has a design similar to CSI-IM of the LTE, and is configured independently from ZP CSI-RS resources for PDSCH rate matching.

In the NZP CSI-RS-based IMR, each port emulates an interference layer with a (preferred channel and) precoded NZP CSI-RS.

This is for intra-cell interference measurement in the multi-user case, and mainly targets MU interference.

The base station transmits the precoded NZP CSI-RS to the terminal on each port of the configured NZP CSI-RS-based IMR.

The terminal measures interference by assuming a channel/interference layer for each port in the resource set.

For a channel, when there is no PMI and RI feedback, a number of resources are configured in a set, and the base station or network indicates a subset of NZP CSI-RS resources for channel/interference measurement through DCI.

The resource setting and the resource setting configuration will be described in more detail.

Resource Setting

Each CSI resource setting 'CSI-ResourceConfig' includes a configuration for an S≥1 CSI resource set (given by the higher layer parameter csi-RS-ResourceSetList).

Here, the CSI resource setting corresponds to the CSI-RS-resourcesetlist.

Here, S represents the number of configured CSI-RS resource sets.

Here, the configuration for the S≥1 CSI resource set is the SS/PBCH block (SSB) resource used for each CSI resource set including CSI-RS resources (consisting of NZP CSI-RS or CSI-IM) and an SS/PBCH block (SSB) resource used for L1-RSRP computation.

Each CSI resource setting is located in DL bandwidth part (BWP) identified by the higher layer parameter bwp-id.

All CSI resource settings linked to the CSI reporting setting have the same DL BWP.

The time domain behavior of the CSI-RS resource within the CSI resource setting included in the CSI-ResourceConfig IE is indicated by the higher layer parameter resourceType, and may be set to aperiodic, periodic or semi-persistent.

For periodic and semi-persistent CSI resource settings, the number S of configured CSI-RS resource sets is limited to '1'.

For periodic and semi-persistent CSI resource settings, the set period and slot offset are given in the numerology of the associated DL BWP, as given by the bwp-id.

When the UE is configured for multiple CSI-ResourceConfigs including the same NZP CSI-RS resource ID, the same time domain behavior is configured for CSI-ResourceConfig.

When the UE is configured for multiple CSI-ResourceConfigs including the same NZP CSI-RS resource ID, the same time domain behavior is configured for CSI-ResourceConfig.

Next, one or more CSI resource settings for channel measurement (CM) and interference measurement (IM) are configured through higher layer signaling.

CSI-IM resource for interference measurement.

NZP CSI-RS resource for interference measurement.

NZP CSI-RS resource for channel measurement.

That is, a channel measurement resource (CMR) may be an NZP CSI-RS for CSI acquisition, and an interference measurement resource (IMR) may be CSI-IM and NZP CSI-RS for IM.

Here, CSI-IM (or ZP CSI-RS for IM) is mainly used for inter-cell interference measurement.

The NZP CSI-RS for IM is mainly used for intra-cell interference measurement from multi-user.

The UE may assume that CSI-RS resource(s) for channel measurement and CSI-IM/NZP CSI-RS resource(s) for interference measurement configured for one CSI reporting are 'QCL-TypeD' for each resource.

Resource Setting Configuration

As described above, the resource setting may mean a resource set lists.

For aperiodic CSI, each trigger state set using the higher layer parameter CSI-AperiodicTriggerState is associated with one or more CSI-ReportConfig in which each CSI-ReportConfig is linked to a periodic, semi-persistent, or aperiodic resource setting.

One reporting setting may be connected with up to three resource settings.

When one resource setting is configured, the resource setting (given by higher layer parameter resourcesForChannelMeasurement) is for channel measurement for L1-RSRP computation.

When two resource settings are configured, the first resource setting (given by higher layer parameter resourcesForChannelMeasurement) is for channel measurement, and the second resource setting (given by csi-IM-ResourcesForInterference or nzp-CSI-RS-ResourcesForInterference) is for interference measurement performed on CSI-IM or NZP CSI-RS.

When three resource settings are configured, the first resource setting (given by resourcesForChannelMeasurement) is for channel measurement, the second resource setting (given by csi-IM-ResourcesForInterference) is for CSI-IM-based interference measurement, and the third resource setting (given by nzp-CSI-RS-ResourcesForInterference) is for NZP CSI-RS based interference measurement.

For semi-persistent or periodic CSI, each CSI-ReportConfig is linked to a periodic or semi-persistent resource setting.

When one resource setting (given by resourcesForChannelMeasurement) is configured, the resource setting is for channel measurement for L1-RSRP computation.

When two resource settings are configured, the first resource setting (given by resourcesForChannelMeasurement) is for channel measurement, and the second resource setting (given by higher layer parameter csi-IM-ResourcesForInterference) is used for interference measurement performed on CSI-IM.

The CSI computation related to CSI measurement will be described.

When the interference measurement is performed on CSI-IM, each CSI-RS resource for channel measurement is associated with each CSI-IM resource by each resource according to the order of CSI-RS resources and CSI-IM resources within the corresponding resource set.

The number of CSI-RS resources for channel measurement is the same as the number of CSI-IM resources.

When the interference measurement is performed in the NZP CSI-RS, the UE does not expect that one or more NZP CSI-RS resources are configured in the associated resource set within the resource setting for channel measurement.

The UE in which the higher layer parameter nzp-CSI-RS-ResourcesForInterference is configured does not expect that 18 or more NZP CSI-RS ports are configured within the NZP CSI-RS resource set.

For the CSI measurement, the terminal assumes the following.

Each NZP CSI-RS port configured for the interference measurement corresponds to an interference transport layer.

All interference transport layers of the NZP CSI-RS port for interference measurement consider an EPRE (energy per resource element) ratio.

Another interference signal on RE(s) of NZP CSI-RS resource for channel measurement, NZP CSI-RS resource for interference measurement, or CSI-IM resource for interference measurement.

The CSI reporting procedure will be described in more detail.

For the CSI reporting, time and frequency resources that the UE may use are controlled by the base station.

The channel state information (CSI) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), or L1-RSRP.

For CQI, PMI, CRI, SSBRI, LI, RI, and L1-RSRP, the UE is configured by a higher layer as N≥1 CSI-ReportConfig reporting setting, M≥1 CSI-ResourceConfig resource setting, and a list of one or two trigger states (provided by aperiodicTriggerStateList and semiPersistentOnPUSCH-TriggerStateList).

In the aperiodicTriggerStateList, each trigger state includes a channel and an associated CSI-ReportConfigs list selectively indicating resource set IDs for interference In the semiPersistentOnPUSCH-TriggerStateList, each trigger state includes one associated CSI-ReportConfig.

The time domain behavior of the CSI reporting supports periodic, semi-persistent, and aperiodic.

Hereinafter, the periodic, semi-persistent (SP), and aperiodic CSI reporting each will be described.

Periodic CSI reporting is performed on short PUCCH and long PUCCH.

Periodicity and slot offset of the periodic CSI reporting may be set to RRC, and refer to CSI-ReportConfig IE.

Next, the SP CSI reporting is performed on short PUCCH, long PUCCH, or PUSCH.

In the case of the SP CSI on the short/long PUCCH, the periodicity and slot offset are set to RRC, and the CSI reporting is activated/deactivated by a separate MAC CE.

In the case of the SP CSI on PUSCH, the periodicity of the SP CSI reporting is set to RRC, but the slot offset is not set to RRC, and the SP CSI reporting is activated/deactivated by DCI (format 0_1).

The initial CSI reporting timing follows the PUSCH time domain allocation value indicated by DCI, and the subsequent CSI reporting timing follows the period set by RRC.

For the SP CSI reporting on PUSCH, a separate RNTI (SP-CSI C-RNTI) is used.

The DCI format 0_1 includes a CSI request field, and may activate/deactivation a specific configured SP-CSI trigger state.

In addition, the SP CSI reporting has the same or similar activation/deactivation as the mechanism having data transmission on the SPS PUSCH.

Next, the aperiodic CSI reporting is performed on PUSCH and is triggered by DCI.

In the case of AP CSI having AP CSI-RS, AP CSI-RS timing is set by RRC.

Here, timing for AP CSI reporting is dynamically controlled by DCI.

A method for dividing and reporting CSI in a plurality of reporting instances that have been applied to PUCCH-based CSI reporting in LTE (for example, transmission in the order of RI, WB PMI/CQI, and SB PMI/CQI) is not applied to the NR.

Instead, the NR restricts the setting of a specific CSI report in the short/long PUCCH, and a CSI omission rule is defined.

In connection with the AP CSI reporting timing, the PUSCH symbol/slot location is dynamically indicated by DCI. Candidate slot offsets are set by RRC.

For the CSI reporting, a slot offset (Y) is set for each reporting setting.

For UL-SCH, slot offset K2 is set separately.

Two CSI latency classes (low latency class and high latency class) are defined in terms of CSI computation complexity.

The low latency CSI is WB CSI including a maximum of 4 ports Type-I codebook or a maximum of 4-ports non-PMI feedback CSI.

The high latency CSI refers to CSI other than low latency CSI.

For a normal terminal, (Z, Z') is defined in units of OFDM symbols.

Z represents the minimum CSI processing time until CSI reporting is performed after receiving the Aperiodic CSI triggering DCI.

Z' represents the minimum CSI processing time until the CSI reporting is performed after receiving the CSI-RS for the channel/interference.

Additionally, the terminal reports the number of CSIs that may be simultaneously calculated.

Type II Codebook

In the UE that is composed of 4 antenna ports {3000, 3001, ..., 3003}, 8 antenna ports {3000, 3001, ..., 3007}, 12 antenna ports {3000, 3001, ..., 3011}, 16 antenna ports {3000, 3001, ..., 3032}, 32 antenna ports {3000, 3001, ..., 3031}, and is composed of higher layer parameter codebookType configured as 'typeII'

Values of $N_1$ and $N_1$ are individually composed of higher layer parameters $n_1$-$n_2$-codebookSubsetRestriction and CodebookConfig-N2. The supported configurations of ($N_1$, $N_2$) and values corresponding to ($O_1$, $O_2$) for a given number of CSI-RS ports are shown in Table 7 below.

TABLE 7

| Number of CSI-RS antenna ports, $P_{CSI-RS}$ | ($N_g$, $N_1$, $N_2$) | ($O_1$, $O_2$) |
| --- | --- | --- |
| 8 | (2, 2, 1) | (4, 1) |
| 16 | (2, 4, 1) | (4, 1) |
|  | (4, 2, 1) | (4, 1) |
|  | (2, 2, 2) | (4, 4) |
| 32 | (2, 8, 1) | (4, 1) |
|  | (4, 4, 1) | (4, 1) |
|  | (2, 4, 2) | (4, 4) |
|  | (4, 2, 2) | (4, 4) |

The L value is configured for the higher layer parameter numberOfbeams. Here, when the $P_{CSI-RS}$ value is 4, the L value is 2, and when the $P_{CSI-RS}$ value is greater than 4, the L value belongs to {2, 3, 4}.

The value of $N_{PSK}$ is composed of the higher layer parameter phaseAlphabetSize, and the $N_{PSK}$ belongs to {4, 8}.

The UE is configured by setting the higher layer parameter subbandAmplitude to 'true' or 'false'.

The UE should not report RI>2.

When a v value associated with the RI value is less than 2, codebook indexes i1 and i2 corresponding to each PMI value are as shown in Equation 4 below.

$$i_1 = \begin{cases} [i_{1,1} \; i_{1,2} \; i_{1,3,1} \; i_{1,4,1}] & v=1 \\ [i_{1,1} \; i_{1,2} \; i_{1,3,1} \; i_{1,4,1} \; i_{1,3,2} \; i_{1,4,2}] & v=2 \end{cases}$$ [Equation 4]

$$i_2 = \begin{cases} [i_{2,1,1}] & subbandAmplitude = \text{'false'}, v=1 \\ [i_{2,1,1} \; i_{2,1,2}] & subbandAmplitude = \text{'false'}, v=2 \\ [i_{2,1,1} \; i_{2,2,1}] & subbandAmplitude = \text{'true'}, v=1 \\ [i_{2,1,1} \; i_{2,2,1} \; i_{2,1,2} \; i_{2,2,2}] & subbandAmplitude = \text{'true'}, v=2 \end{cases}$$

The L vectors combined by the codebook are identified by $i_{1,1}$ and $i_{1,2}$ indices, and each value is shown in Equation 5 below.

$$i_{1,1} = [q_1 \; q_2]$$ [Equation 5]

$$q_1 \in \{0, 1, \ldots, O_1 - 1\}$$

$$q_2 \in \{0, 1, \ldots, O_2 - 1\}$$

$$i_{1,2} \in \left\{0, 1, \ldots, \binom{N_1 N_2}{L} - 1\right\}$$

$$n_1 = [n_1^{(0)}, \ldots, n_1^{(L-1)}]$$

$$n_2 = [n_2^{(0)}, \ldots, n_2^{(L-1)}]$$

-continued $$n_1^{(i)} \in \{0, 1, \ldots, N_1 - 1\}$$

$$n_2^{(i)} \in \{0, 1, \ldots, N_2 - 1\}$$

$$C(x, y) = \begin{cases} \binom{x}{y} & x \geq y \\ 0 & x < y \end{cases}$$

The value of C(x,y) in Equation 5 is given by Table 8 below.

TABLE 8

| x | y | | | |
| --- | --- | --- | --- | --- |
|  | 1 | 2 | 3 | 4 |
| 0 | 0 | 0 | 0 | 0 |
| 1 | 1 | 0 | 0 | 0 |
| 2 | 2 | 1 | 0 | 0 |
| 3 | 3 | 3 | 1 | 0 |
| 4 | 4 | 6 | 4 | 1 |
| 5 | 5 | 10 | 10 | 5 |
| 6 | 6 | 15 | 20 | 15 |
| 7 | 7 | 21 | 35 | 35 |
| 8 | 8 | 28 | 56 | 70 |
| 9 | 9 | 36 | 84 | 126 |
| 10 | 10 | 45 | 120 | 210 |
| 11 | 11 | 55 | 165 | 330 |
| 12 | 12 | 66 | 220 | 495 |
| 13 | 13 | 78 | 286 | 715 |
| 14 | 14 | 91 | 364 | 1001 |
| 15 | 15 | 105 | 455 | 1365 |

Elements of $n_1$ and $n_2$ may be derived from $i_{1,2}$ by Equation 6 below.

$$s_{-1} = 0$$

for $i=0, \ldots, L-1$ [Equation 6]

Find the largest $x^* \in \{L-1-i, \ldots, N_1 N_2 - 1 - i\}$ in Table 5.2.2.2.3-1 such that $$i_{1,2} - s_{i-1} \geq C(x^*, L-i)$$

$$e_i = C(x^*, L-i)$$

$$s_i = s_{i-1} + e_i$$

$$n^{(i)} = N_1 N_2 - 1 - x^*$$

$$n_1^{(i)} = n^{(i)} \bmod N_1$$

$$n_2^{(i)} = \frac{(n^{(i)} - n_1^{(i)})}{N_1}$$

When the values of n and $n_2$ are known values, $i_{1,2}$ may be derived by Equation 7 below.

$$n^{(i)} = N_1 n_2^{(i)} + n_1^{(i)},$$ [Equation 7]

where index i=0, 1, ..., L−1 is allocated such that n(i) increases as i increases.

$$i_{1,2} = \sum_{i=0}^{L-1} C(N_1 N_2 - 1 - n^{(i)}, L-i)$$

If $N_2$ value is 1, $q_2$ value is 0, and a value of $n_2^{(i)}$ for i=0, 1, . . . , L−1 is 0, $q_2$ is not reported.

If $(N_i, N_2)=(2, 1)$, $n_1=[0, 1]$ and n2=[0, 0], $i_{1,2}$ is not reported.

If $(N_i, N_2)=(4, 1)$, L=4, $n_1=[0, 1, 2, 3]$ and $n_2=[0, 0, 0, 0]$, $i_{1,2}$ is not reported.

If $(N_i, N_2)=(2, 2)$, L=4, $n_1=[0, 1, 0, 1]$ and $n_2=[0, 0, 1, 1]$, $i_{1,2}$ is not reported.

The largest coefficient on Layer 1 (l=1, . . . v) is identified by $i_{1,3,l} \in \{0, 1, \ldots, 2L-1\}$.

The amplitude coefficient indicators and $i_{2,2,1}$ are as shown in Equation 8 below.

$$i_{1,4,l} = [k_{l,0}^{(1)}, k_{l,1}^{(1)}, \ldots, k_{l,2L-1}^{(1)}]$$ [Equation 8]

$$i_{2,2,l} = [k_{l,0}^{(2)}, k_{l,1}^{(2)}, \ldots, k_{l,2L-1}^{(2)}]$$

$$k_{l,i}^{(1)} \in \{0, 1, \ldots, 7\}$$

$$k_{l,i}^{(2)} \in \{0, 1\}$$

For l=1, . . . v, the mapping from to amplitude coefficient is shown in Table 9 below, and the mapping from to amplitude coefficient is shown in Table 10 below.

At this time, the amplitude coefficient is as shown in Equation 9 below.

$$p_l^{(1)} = [p_{l,0}^{(1)}, p_{l,1}^{(1)}, \ldots, p_{l,2L-1}^{(1)}]$$ [Equation 9]

$$p_l^{(2)} = [p_{l,0}^{(2)}, p_{l,1}^{(2)}, \ldots, p_{l,2L-1}^{(2)}]$$

TABLE 9

| $k_{l,i}^{(1)}$ | $p_{l,i}^{(1)}$ |
|---|---|
| 0 | 0 |
| 1 | $\sqrt{1/64}$ |
| 2 | $\sqrt{1/32}$ |
| 3 | $\sqrt{1/16}$ |
| 4 | $\sqrt{1/8}$ |
| 5 | $\sqrt{1/4}$ |
| 6 | $\sqrt{1/2}$ |
| 7 | 1 |

TABLE 10

| $k_{l,i}^{(2)}$ | $p_{l,i}^{(2)}$ |
|---|---|
| 0 | $\sqrt{1/2}$ |
| 1 | 1 |

The phase coefficient indicator is as shown in Equation 10 below.

$$i_{2,1,l} = [c_{l,0}, c_{l,1}, \ldots, c_{l,2L-1}] \text{ for } l=1, \ldots, v$$ [Equation 10]

The amplitude and phase coefficient indicators are reported as follows.

Indicator $k_{l,i_{1,3,l}}^{(1)}=7$, $k_{l,i_{1,3,l}}^{(2)}=1$ and $c_{l,i_{1,3,l}}=0$ (l=1, . . . , v). $c_{l,i_{1,3,l}}$, $k_{l,i_{1,3,l}}^{(2)}$ and $c_{l,i_{1,3,l}}$ are not reported for l=1, . . . , v.

The remaining 2L-1 elements of $i_{1,4,l}$ (l=1, . . . , v) are not reported. Here, $k_{l,i}^{(1)} \in \{0,1, \ldots, 7\}$. $M_l$(l=1, . . . , v) may be the number of elements $i_{1,4,l}$ satisfying $k_{l,i}^{(1)}>0$.

The remaining 2L-1 elements of $i_{2,1,l}$ and $i_{2,2,l}$ are reported as follows.

When subbandAmplitude is set to 'false', $k_{l,i}^{(2)}$ and i=0, 1, . . . , 2L−1. $i_{2,2,l}$ for l=0, 1, . . . , v are not reported for l=1, . . . , v.

For l=1, . . . , v, elements of $i_{2,1,l}$ corresponding to coefficients satisfying $k_{l,i}^{(1)}>0$, i≠$i_{1,3,l}$ are not reported. Here, $c_{l,i} \in \{0,1, \ldots, N_{PSK}-1\}$ and the remaining $2L-M_1$ elements of $i_{2,1,l}$ are not reported, and $c_{l,i}=0$ is set.

When subbandAmplitude is set to 'true',

For l=0, 1, . . . ,v, elements of $i_{2,2,l}$ and $i_{2,1,l}$ corresponding to the strongest coefficient min($M_1$, $K^{(2)}$)−1 (excluding the strongest coefficient indicated by $i_{1,3,l}$) as determined by the corresponding reporting element of $i_{1,4,l}$ are reported. Here, $k_{l,i}^{(2)} \in \{0, 1,\}$, and $c_{l,i} \in \{0,1, \ldots, N_{PSK}-1\}$. A value of $K^{(2)}$ is given by the following Table 11. The remaining elements 2L−min ($M_l, K^{(2)}$) of $i_{2,2,l}$ are not reported, and $k_{l,i}^{(2)}=1$. The elements of $i_{2,2,l}$ corresponding to a coefficient $M_l$−min($M_l, K^{(2)}$), not the weakest 0dl are reported. Here, $c_{l,i} \in \{0,1, 2,3\}$. The remaining elements $2L-M_l$ of $i_{2,2,l}$ are not reported, and $c_{l,i}=0$.

For two elements, $k_{l,x}^{(1)}$ and $k_{l,y}^{(1)}$ for the reported element of $i_{1,4,l}$ are the same as ($k_{l,x}^{(1)}=k_{l,y}^{(1)}$), and the priority is specified such that the element min (x, y) is included in the set of the strongest coefficient min($M_l,K^{(2)}$)−1 for $i_{2,1,l}$ and $i_{2,2,l}$ (l=1, . . . v).

TABLE 11

| L | $K^{(2)}$ |
|---|---|
| 2 | 4 |
| 3 | 4 |
| 4 | 6 |

Codebooks for layers 1 to 2 are given in Table 12 below. Here, the indexes $m_1^{(i)}$ and $m_2^{(i)}$ are given by Equation 11 below.

$$m_1^{(i)} = O_1 n_1^{(i)} + q_1$$

$$m_2^{(i)} = O_2 n_2^{(i)} + q_2$$ [Equation 11]

In Equation 11, $\phi_{l,i}$, $u_m$, and $v_{l,m}$ for i=0, 1, . . . , L−1 are given by Equation 12 below

[Equation 12]

$$\varphi_{l,i} = \begin{cases} e^{j2\pi c_{l,i}/N_{PSK}} & \text{subbandAmplitude = 'false'} \\ e^{j2\pi c_{l,i}/N_{PSK}} & \text{subbandAmplitude = 'true', min}(M_l, K^{(2)}) \text{ strongest} \\ & \text{coefficients (including } i_{1,3,l}) \text{ with } k_{l,i}^{(1)} > 0 \\ e^{j2\pi c_{l,i}/4} & \text{subbandAmplitude = 'true', } M_l - \min(M_l, K^{(2)}) \\ & \text{weakest coefficients with } k_{l,i}^{(1)} > 0 \\ 1 & \text{subbandAmplitude = 'true', } 2L - M_l \text{ coefficients} \\ & \text{with } k_{l,i}^{(1)} = 0 \end{cases}$$

$$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

TABLE 12

| Layers | |
|---|---|
| $\upsilon = 1$ | $W^{(1)}_{q_1,q_2,n_1,n_2,p_1^{(1)},p_1^{(2)},i_{2,1,1}} = W^1_{q_1,q_2,n_1,n_2,p_1^{(1)},p_1^{(2)},i_{2,1,1}}$ |
| $\upsilon = 2$ | $W^{(2)}_{q_1,q_2,n_1,n_2,p_1^{(1)},p_1^{(2)},i_{2,1,1},p_2^{(1)},p_2^{(2)},i_{2,1,2}} = \frac{1}{\sqrt{2}} \left[ W^1_{q_1,q_2,n_1,n_2,p_1^{(1)},p_1^{(2)},i_{2,1,1}} \quad W^2_{q_1,q_2,n_1,n_2,p_2^{(1)},p_2^{(2)},i_{2,1,2}} \right]$ | where $W^l_{q_1,q_2,n_1,n_2,p_l^{(1)},p_l^{(2)},c_l} = \dfrac{1}{\sqrt{N_1 N_2 \sum_{i=0}^{2L-1}(p_{l,i}^{(1)} p_{l,i}^{(2)})^2}} \begin{bmatrix} \sum_{i=0}^{L-1} v_{m_1^{(i)},m_2^{(i)}} p_{l,i}^{(1)} p_{l,i}^{(2)} \varphi_{l,i} \\ \sum_{i=0}^{L-1} v_{m_1^{(i)},m_2^{(i)}} p_{l,i+L}^{(1)} p_{l,i+L}^{(2)} \varphi_{l,i+L} \end{bmatrix}$, $l = 1, 2$, and the mappings from $i_1$ to $q_1, q_2, n_1, n_2, p_1^{(1)}$, and $p_2^{(1)}$, and from $i_2$ to $i_{2,1,1}$, $i_{2,1,2}$, $p_1^{(2)}$ and $p_2^{(2)}$ are as described above, including the ranges of the constituent indices of $i_1$ and $i_2$.

CSI Reporting Using PUSCH

Figure 13:
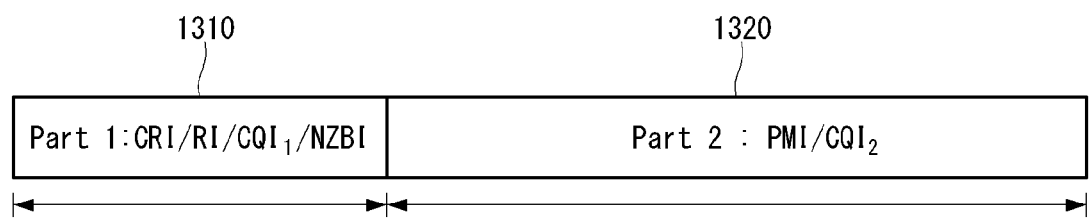
FIG. 13 is a diagram illustrating an example of information payload of PUSCH-based CSI reporting.

FIG. 13 is a diagram illustrating an example of information payload of PUSCH-based CSI reporting.

NZBI is a parameter indicating an indication of the number of non-zero wideband amplitude coefficients per layer for the Type II PMI codebook.

That is, the NZBI is a parameter indicating the indication of the number of non-zero wideband amplitude coefficients per layer for the Type II PMI codebook.

That is, the NZBI is an indicator indicating a relative amplitude coefficient that is zero or is not zero.

Alternatively, the NZBI may represent the number of zero amplitude beams or non-zero amplitude beams, and may be referred to as N_RPI0.

When decoding for DCI is successful, the terminal performs aperiodic CSI reporting using a PUSCH of a serving cell c.

The aperiodic CSI reporting performed in the PUSCH supports wideband and sub-band frequency granularity.

The aperiodic CSI reporting performed in the PUSCH supports Type I and Type II CSI.

When decoding for DCI format 0_1 that activates a semi-persistent (SP) CSI trigger state is successful, the terminal performs the SP CSI reporting on the PUSCH.

The DCI format 0_1 includes a CSI request field indicating an SP CSI trigger state to be activated or deactivated.

The SP CSI report for the PUSCH supports Type I and Type II CSI with wideband and sub-band frequency granularity.

The PUSCH resource and modulation and coding scheme (MCS) for the SP CSI reporting are semi-permanently allocated by UL DCI.

The CSI report for the PUSCH may be multiplexed with UL data on the PUSCH.

In addition, the CSI reporting for the PUSCH may be performed without multiplexing with UL data.

For the Type I and Type II CSI on the PUSCH, the CSI reporting includes two parts (part 1 and part 2) as illustrated in FIG. 11.

Part 1 1310 is used to identify the number of information bits in part 2 1320. The whole part 1 is transmitted before the part 2.

For Type I CSI feedback, the part 1 includes RI (if reported), CRI (if reported), and CQI of a first codeword.

The part 2 includes PMI, and includes CQI for a second codeword when RI>4.

For Type II CSI feedback, the part 1 has a fixed payload size, and includes an indication (NZBI) for the number of non-zero wideband amplitude coefficients per layer for RI, CQI, and Type II CSI.

In the part 1, the RI, CQI and NZBI are encoded separately.

The part 2 includes the PMI of the Type II CSI.

The part 1 and part 2 are encoded separately.

The Type II CSI report transported on the PUSCH is computed independently from all Type II CSI reporting transported in PUCCH format 1, 3 or 4.

When the higher layer parameter reportQuantity is set to one of the values of 'cri-RSRP' or 'ssb-Index-RSRP', the CSI feedback is composed of a single part.

For Type I and Type II CSI reporting that is set for PUCCH but transmitted in PUSCH, the encoding scheme follows the encoding scheme of the PUCCH.

When the CSI reporting includes two parts in the PUSCH, and the CSI payload to be reported is less than the payload size provided by the PUSCH resource allocated for the CSI reporting, the UE may omit part of the Part 2 CSI.

Part 2 CSI omission is determined according to priority, Priority 0 is the highest priority.

CSI Reporting Using PUCCH

The terminal is semi-statically configured by the higher layer to perform the periodic CSI report on the PUCCH.

The terminal may be configured as a higher layer for a plurality of periodic CSI reports corresponding to a CSI report setting indication set to one or more higher layers in which the associated CSI measurement link and CSI resource setting are set to a higher layer.

In PUCCH format 2, 3, or 4, the periodic CSI reporting supports Type I CSI in wideband units.

For the SP CSI on the PUSCH, the terminal transmits HARQ-ACK corresponding to the PDSCH transporting the selection command in slot n, and then starts from n+[(3N)]_slot^(subframe, μ)+1 to perform the SP CSI report in the applied PUCCH.

The selection command includes one or more report setting indications in which the associated CSI resource setting is configured.

In the PUCCH, the SP CSI report supports the Type I CSI.

The SP CSI report for the PUCCH format 2 supports the Type I CSI with the wideband frequency granularity. In the PUCCH format 3 or 4, the SP CSI report supports the Type I sub-band CSI and Type II CSI with the wideband frequency granularity.

When the PUCCH transports the Type I CSI with the wideband frequency granularity, the CSI payload transported by the PUCCH format 2 and PUCCH format 3 or 4 is the same regardless of RI (if reported) and CRI (if reported).

In the case of the Type I CSI sub-band report in the PUCCH format 3 or 4, the payload is divided into two parts.

The first part (Part 1) includes RI (if reported), CRI (if reported), and CQI of the first codeword.

The second part (part 2) includes PMI, and includes CQI for the second codeword when RI>4.

The SP CSI reporting transported in the PUCCH format 3 or 4 supports Type II CSI feedback, but supports only Part 1 of Type II CSI feedback.

In the PUCCH format 3 or 4 supporting the Type II, the CSI report may depend on UE capability.

The Type II CSI report (part 1 only) transported in the PUCCH format 3 or 4 is computed independently from the Type II CSI report transported in the PUSCH.

When the terminal is set to the CSI reporting in the PUCCH format 2, 3 or 4, each PUCCH resource is configured for each candidate UL BWP.

When the terminal is configured for the active SP CSI report configuration on the PUCCH and does not receive a deactivation command, the CSI reporting is performed when the BWP in which CSI reporting is performed is the active BWP, or otherwise, the CSI reporting is temporarily paused. The above operation is also applied in the case of P CSI on PUCCH. When BWP switching occurs for PUSCH-based SP CSI report, it is understood that the corresponding CSI report is automatically deactivated.

Table 13 shows an example of a PUCCH format.

TABLE 13

| PUCCH format | Length in OFDM symbols $N_{symb}^{PUCCH}$ | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

In Table 13, $N_{symb}^{PUCCH}$ represents a length of PUCCH transmission in an OFDM symbol.

In addition, the PUCCH format is divided into a short PUCCH or a long PUCCH according to the length of the PUCCH transmission.

In Table 13, PUCCH formats 0 and 2 may be referred to as the short PUCCH, and the PUCCH formats 1, 3 and 4 may be referred to as the long PUCCH.

Hereinafter, the PUCCH-based CSI reporting is divided into the short PUCCH-based CSI reporting and the long PUCCH-based CSI reporting, which will be described in more detail.

Figure 14:
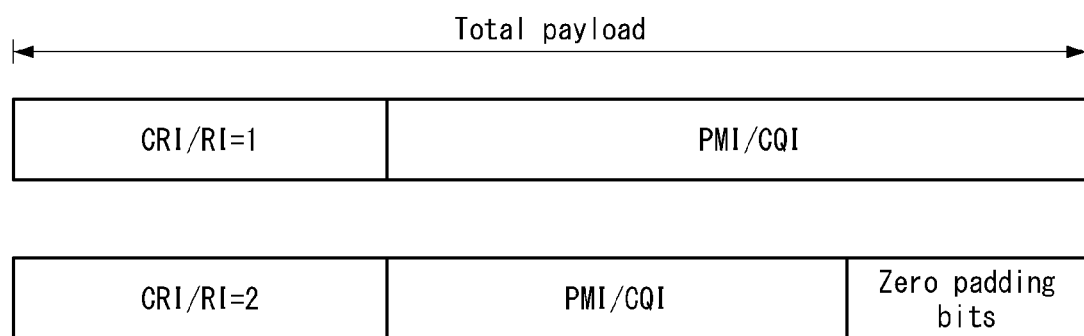
FIG. 14 is a diagram illustrating an example of information payload of short PUCCH-based CSI reporting.

FIG. 14 illustrates an example of information payload of the short PUCCH-based CSI reporting.

The short PUCCH-based CSI reporting is used only for wideband CSI reporting.

The short PUCCH-based CSI reporting has the same information payload regardless of RI/CRI in a given slot (to avoid blind decoding).

The size of the information payload may be different according to the most CSI-RS ports of CSI-RS configured within the CSI-RS resource set.

When the payload including the PMI and CQI is diversified into RI/CQI, padding bits are added to RI/CRI/PMI/CQI prior to encoding to equalize payloads associated with different RI/CRI values.

In addition, the RI/CRI/PMI/CQI may be encoded together with the padding bits if necessary.

Next, the long PUCCH-based CSI reporting will be described.

Figure 15:
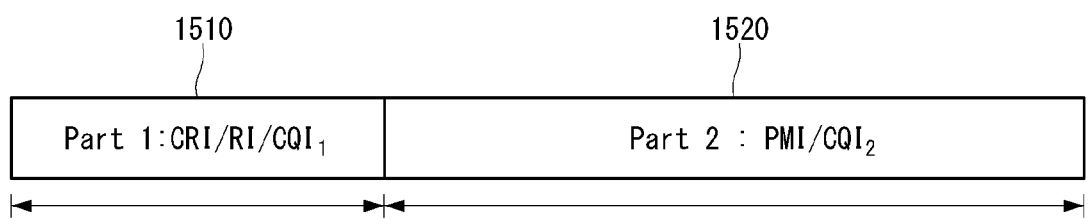
FIG. 15 is a diagram illustrating an example of information payload of long PUCCH-based CSI reporting.

FIG. 15 is a diagram illustrating an example of information payload of long PUCCH-based CSI reporting.

The long PUCCH-based CSI reporting may use the same solution as the short PUCCH for wideband reporting.

The long PUCCH-based CSI reporting has the same payload regardless of RI/CRI.

For the subband reporting, two-part encoding (For Type I) is applied.

Part 1 1510 has a fixed payload according to the number of ports, a CSI type, RI restriction, etc., and Part 2 1520 may have various payload sizes according to the part 1.

The CRI/RI may first be decoded to determine the payload of PMI/CQI.

CQIi (i=1, 2) corresponds to CQI for an i-th codeword (CW).

For the long PUCCH, Type II CSI reporting may be transported only in Part 1.

Since one slot in the NR is defined as 14 slots, the actual periodicity and offset for CSI reporting described in Table 1 are determined according to the neurology of the uplink band.

However, when the UL active bandwidth part is changed while the DL active bandwidth part is not changed, the periodicity and offset of the changed uplink bandwidth part are changed depending on the neurology of the bandwidth part.

For example, when the existing setting was 20 slot period but the subcarrier spacing is increased by 2 times, the symbol duration is reduced by half, and thus the set 20 slot period may use half of the actual time (for example, 10 ms for 30 kHZ SCS) compared to the previously set value (for example, 20 ms for 15 kHZ SCS).

In this way, by newly setting the UL active BWP, the periodicity for reporting the CSI may be different from the intention.

In particular, unlike the case of an unpaired band (e.g., TDD), since the paired band (e.g., FDD) may set the BWP independently activated for UL and DL, the DL active BWP is fixed and the UL active BWP may be changed.

Accordingly, because the UL neurology is changed, different operations may naturally occur different from the setting for reporting of CSI.

<Start of Present Disclosure>

In an environment such as NR, high-resolution feedback such as linear combination (linear combination LC) and covariance feedback may be considered for more accurate CSI feedback. In particular, in the Type II codebook, a codebook (i.e., the aforementioned LC codebook) may be configured by linearly combining a plurality of orthogonal DFT beams, and at this time, the codebooks may be configured to be linearly combined while having independent amplitude and phase coefficients according to the number of configured layers. And linearly combined to form a codebook.

The maximum number of layers of the Type II codebook currently supported in the NR is 2, and the maximum number of layers is increased by extending the layer independent coefficient determination method for such codebooks to increase multi-user/singe-user (MU/SU) MIMO performance.

However, this may improve MU/SU MIMO performance, but there may be a problem in that the payload therefor becomes very large in proportion to the number of layers.

Therefore, the present disclosure solves this problem of extreme increase in payload and proposes a codebook design to increase the maximum number of support layers.

First, in the configuration of the LC codebook, a 2D DFT beam to be applied to a 2D antenna array in one panel may be defined. Here, m1 and m2 may be indexes of a 1D-DFT codebook in the $1^{st}$ and $2^{nd}$ domains.

In this case, the LC codebook may be as shown in Equation 13 below.

$$w_{m_1,m_2} = \frac{v_{m_1} \otimes u_{m_2}}{\sqrt{N_1 N_2}} \quad \text{[Equation 13]}$$

In Equation 13, variables may be defined as follows.
$N_1$ and $N_2$ are the number of antenna ports of each pole of the first and second dimension in the panel
$o_1$ and $o_2$ are oversampling factors of the first and second dimension in the panel $$v_{m_1} = \left[1 \quad \exp\left(j\frac{2\pi m_1}{o_1 N_1}\right) \quad \cdots \quad \exp\left(j\frac{2\pi m_1(N_1-1)}{o_1 N_1}\right)\right]^T$$

$$u_{m_2} = \left[1 \quad \exp\left(j\frac{2\pi m_2}{o_2 N_2}\right) \quad \cdots \quad \exp\left(j\frac{2\pi m_2(N_2-1)}{o_2 N_2}\right)\right]^T$$

In the case of Equation 13, it shows an example in which the port indexing is first performed in the $N_2$ domain, and Equation 13 may be obviously extended even when the $N_1$ domain is first indexed. Here, the antenna port may be mapped to an antenna element according to antenna virtualization.

Using a DFT beam (which may include both the 2D-DFT and 1D-DFT beam, hereinafter will be collectively referred to as a DFT beam in the present disclosure) defined by Equation 13, the configuration method of the LC codebook represented by Type II CSI in NR may be determined by Equation 14 below.

Equation 14 below shows an example of a rank 1 codebook configuration.

$$W^{(1)} = \frac{1}{\sqrt{\eta}} \begin{bmatrix} b_1 & \cdots & b_L & 0 \\ 0 & & b_1 & \cdots & b_L \end{bmatrix} \begin{bmatrix} p_1 & 0 & 0 \\ 0 & \ddots & 0 \\ 0 & 0 & p_{2L} \end{bmatrix} \begin{bmatrix} c_1 \\ \vdots \\ c_{2L} \end{bmatrix} \quad \text{[Equation 14]}$$

Equation bi represents an i-th basis beam vector (i=1, . . . L) constituting an LC codebook, and a DFT beam or a specific codebook using Equation 13 may be used according to the following embodiment. In the Grid of Beam (GoB) of the DFT beam spanned by Equation 14, a specific rule, for example, L beams may be selected and configured within an orthogonal DFT beam set most suitable for a given channel.

In this case, L represents the number of beams to be combined, and may be set through a higher layer (RRC and/or MAC CE) or flexible signaling (e.g., DCI), or may be separately reported by the terminal.

In addition, although it has been exemplified that the same beam group {bi} is configured for each polarization, different beam groups may be used in some cases. The value of pk represents the relative amplitude coefficient of the k-th beam (k=1, . . . 2L, L beams per polarization) when the beams are linearly combined.

For example, in the case of 2 bit-amplitude, pk may have a value of. When the value of $C_k$ is linearly combined, the relative phase coefficient of the k-th beam (k=1, . . . , 2L, L beams per polarization) is represented.

For example, in the case of 2 bit-phase, QPSK or Nbit, may have a value of N-PSK. In order to reduce the payload size of the CSI, it may be represented by the relative size by referring to a specific strongest beam (for example, select a metric corresponding to the amplitude coefficient of a linearly combined beam or a beam having the largest value among 2L beams). In this case, the amplitude and phase of the strongest beam may be fixed to a specific value (for example, 1).

In addition, in the case of, it performs a function of making the power of the codebook to 1 (i.e., Frobenius norm of the final codebook is 1) with the codebook normalization factor, and in some cases, normalization for each layer may be performed independently.

FIG. 16 is a diagram illustrating an example of antenna ports of a CSI-RS to which the methods proposed in the present specification may be applied.

In the codebook configuration described above, a DFT beam as a basis may be selected as illustrated in FIG. 16. FIG. 16 illustrates an example of a 16-port CSI-RS, where ($N_1$, $N_2$) is (4,2).

As illustrated in FIG. 16, one orthogonal beam set may be composed of 8 DFT beams of $N_1 * N_2$, and may be composed of 16 sets of $O_1 * O_2$ in total. The eight beams constituting one orthogonal shim set are orthogonal to each other, and the beams between the beam sets are not orthogonal.

Therefore, in the case of combining beam selection, an optimal beam set is first selected according to a specific metric (for example, max SINR, etc.), and L combination beams may be selected from $N_1 * N_2$ beams through the combination of Equation 15 below.

$$\binom{N_1 N_2}{L} \quad \text{[Equation 15]}$$

Alternatively, more optimal beam selection may be performed by jointly calculating the above two processes.

Since the N1N2 beams included in one orthogonal beam set illustrated in FIG. 16 are orthogonal to each other, an RRC configuration or predetermined L beams perform a linear combination, and even if a final beam is configured, the remaining beams (N1N2−L) other than the L beams selected from the orthogonal beam set may continue to maintain orthogonality with the final combined beam as illustrated in Equation 16 below.

$$v = p_1 c_1 b_1 + \ldots + p_L c_L b_L v \perp b_{L+1}, \ldots, v \perp b_{N_1 N_2}$$
$$(\because b_1 \perp b_2 \perp b_3 \perp \ldots \perp b_{N_1 N_2}) \quad \text{[Equation 16]}$$

In Equation 16, a⊥b indicates that a and b are perpendicular to each other, and the combined beams may be re-numbered first. Hereinafter, a method for configuring a codebook proposed in the present disclosure will be described.

<Proposal. 1>

For the RI value reported by the terminal, some layers are each independently composed of a linear combination of a plurality of beams, and the remaining layers may be composed of selection and/or co-phasing of beams having orthogonality that are not linearly combined to ensure or maintain orthogonality.

Specifically, when the terminal reports a rank indicator of a specific value (for example, R) to the base station, a specific number of layers (for example, the number of layers X=2) may be independently composed of a linear combination of L beams, and R−X layers as the remaining layers may be composed of the selection or co-phasing of (N1N2−L) beams not used for linear combination in an orthogonal beam set including L beams for orthogonality.

For example, when the value of X is '2', layer 2 may be configured with codebook mode 1 or 2, which is a conventional NR method. In this case, proposal 1 may be divided into two cases.

In other words, proposal 1 may be divided into cases where the number (N1N2−L) of beams excluding the L beams participating to configure X layers is greater than 0 and is 0.

Information about X may be provided by the base station to additionally signal the terminal or may be determined in advance.

Alternatively, the terminal may estimate the channel to determine the value of X based on the number of dominant eigenvectors or the ratio of eigen values (for example, condition number), or consider the fed back capacity of channel (for example, PUCCH or PUSCH) to select the X and report the selected value of X to the base station.

At this time, the value of X may be included in the part 1 of CSI, composed of a separate field, and reported by being included in the #of non-zero wideband amplitude coefficient indication field.

In the case of Type I and Type II CSI feedback for PUSCH, the CSI report may be composed of two parts.

The part 1 may be used to identify the number of information bits of Part 2, and the whole may be transmitted before the part 2 is transmitted.

In the case of type I CSI feedback, the part 1 may include RI, CRI, and CQI for the first codeword depending on the reported case, and the part 2 may include PMI. When RI is greater than 4, the part 2 may additionally include CQI for the second codeword.

In the case of the type II CSI feedback, the part 1 has a fixed payload size, and may include an indicator of the number of non-zero wideband amplitude coefficients of each layer for RI, CQI, and type II CSI. The fields of the part 1 may be individually encoded, the part 2 may include PMI of Type II CSI, and the part 1 and part 2 may be individually encoded.

<When (N1N2−L)>0>

For example, there may be cases where the number of ports is a sufficiently large number (for example, 12 ports or more), and cases where the L value is less than 4 while being 8 ports. In this case, if the size of the L value that may be set increases, even 12 ports may not be included in such examples.

In the present embodiment, there may be at least one orthogonal beam, and (R−X) layers may be composed of with the at least one orthogonal beam. Hereinafter, for convenience of description, it is assumed that the number X of layers constituting the linear combination is 2. At this time, values of $v_1$ and $v_2$ for the layer may be expressed by Equation 17 below.

$$\frac{1}{\sqrt{\eta_1}} \begin{bmatrix} p_{1,1}c_{1,1}b_1 + \ldots + p_{L,1}c_{L,1}b_L \\ p_{L+1,1}c_{L+1,1}b_1 + \ldots + p_{2L,1}c_{2L,1}b_L \end{bmatrix} \qquad \text{[Equation 17]}$$

-continued
$$v_2 = \frac{1}{\sqrt{\eta_2}} \begin{bmatrix} p_{1,2}c_{1,2}b_1 + \ldots + p_{L,2}c_{L,2}b_L \\ p_{L+1,2}c_{L+1,2}b_1 + \ldots + p_{2L,2}c_{2L,2}b_L \end{bmatrix}$$

$\eta_1$, $\eta_2$ each are a constant (where 1/R is normalized to make the frobenius norm of the R-layer codebook 1) that normalizes $v_1$ and $v_2$ to 1/R, respectively, and each are i-th (i=1, . . . , 2L) combination amplitude and phase system for each j-th layer configuration, respectively. (I=1, . . . , 2L) represents the combined amplitude and phase meter, respectively, and the granularity of each coefficient is predetermined or may be signaled from the base station to the terminal through a higher layer (e.g., RRC and/or MAC CE) or flexible signaling (for example, DCI).

First, assuming that $S \in \{b_1, b_2, \ldots, b_{N_1N_2}\}$ is the selected orthogonal beam set, the set of beams excluding the beams participating in the linear combination can be defined as $\overline{S}=S\setminus\{b_1, b_2, \ldots b_L\}$, and may be defined as $b_k$, $b_m \in \overline{S}$.

In this case, the remaining layers may be configured as follows.

First Embodiment

The remaining layers may be configured as in Equation 18 below.

$$\frac{1}{\sqrt{R2N_1N_2}} \begin{bmatrix} b_k \\ \phi_k b_{k'} \end{bmatrix} \qquad \text{[Equation 18]}$$

In the first embodiment 1, when R−X layers are configured through beam selection, a method for expressing one layer will be described as an example.

In the case of the first embodiment, for each polarization, different DFT beams ($b_k \neq b_{k'}$) corresponding to a WB PMI index are selected, and 1 bit {1, j} as co-phase information ($\phi_k$) corresponding to one polarization and SB wise as QPSK (2 bit) or 8-PSK (3 bit) may be reported to the base station.

k represents a k-th layer, and X<k□R. At this time, the extension/support scheme to the R−X layer may be as shown in Equation 19 below.

$$\frac{1}{\sqrt{R2N_1N_2}} \begin{bmatrix} b_k & b_k & \ldots & b_n \\ \phi_k b_{k'} & -\phi_k b_{k'} & \ldots & \phi_n b_{n'} \end{bmatrix} \in C^{2N_1N_2 \times (R-X)} \qquad \text{[Equation 19]}$$

In Equation 19, $b_n, b_{n'} \in \overline{S}$, (k≠. . . ≠n). In the first embodiment 1, a Walsh cover code may be used for one layer composed of the same DFT beam(s), and orthogonality is guaranteed, and it may be increased to a maximum of two layers.

That is, in the case of configuring by applying $$\begin{bmatrix} 1 & 1 \\ \phi_k & -\phi_k \end{bmatrix}$$

to $b_k$, $b_{k'}$, in order to guarantee orthogonality of $\phi_k$ as the co-phase information, the pair of layers to which the walsh code is applied should be applied at least equally.

In order to increase the granularity of the configured codebook, $\phi_k\square$ may be independently configured according to the beam(s) constituting the layer, and even in this case, at least the same $\phi_k$ value should be applied to guarantee orthogonality.

In addition, the value of R included in the normalize term is a value for normalizing the codebook composed of the X layer for beam combining+(R−X) for beam selection to 1, and the value of $1/\sqrt{R}$ may be separated out and calculated according to the expression. However, in the present disclosure, for convenience of description, all column vectors of the codebook constituting the R-layer may be configured to have a norm square of 1/R.

In the first embodiment, k=k' and m=m' and n=n' may be considered as a method for reducing a payload size. This is a case of selecting the same DFT beam for each polarization, and it is possible to reduce the payload size for beam selection.

As a modified example of the first embodiment, Equation 20 below may be considered.

$$\frac{1}{\sqrt{R2N_1N_2}}\begin{bmatrix} b_k & b_m & \cdots & b_n \\ \phi_k b_{k'} & \phi_m b_{m'} & \cdots & \phi_n b_{n'} \end{bmatrix} \in C^{2N_1N_2 \times (R-X)} \quad \text{[Equation 20]}$$

In this case, independent beam selection may be performed for each R−X layer, and co-phase may also be performed independently for each layer. In this case, in order to further reduce the payload size, k=k' and m=m' and n=n' may be considered.

<When (N1N2−L)=0>

In this case, an orthogonal DFT beam remaining in an orthogonal beam set exists after beam combining is performed due to a lack of an antenna domain of the transmitting end. As a representative example, there may be a case of 4-port.

In the case of 4-port, the length of the DFT is 2, and the value of the number L of combined beams may also be limited to '2'. In this case, when R is greater than 2, the following options may be considered.

Option 1: Linear combination for the limit of the layer with the value of L from 2 to R. Here, the coefficients of each layer may be independently calculated and encoded.

Option 2: In the linear combination up to the X layer, X is signaled by a higher layer (e.g., RRC and/or MAC CE) or flexible signaling (DCI) or reported by the UE, and the R−X layer may be calculated by the orthogonal procedure like a Gram-Schmidt method.

Both options may also be used when N1N2−L>0.

The method of option 1 has a problem in which the payload of the CSI is linearly increased by the reported RI value, but when the number of combined beams is limited to a small number such as 2, compared to the case where the value of L is '4', the increase rate of the payload of the CSI is only about half.

Accordingly, the payload when L is '2' and R is '4' is similar to the payload when L is '4' and R is '2'.

When simply considering the calculation of the PMI required for calculating the linear combination coefficient, it may be as shown in Table 14.

Although the accurate calculation of the WB PMI such as the beam selection is not considered, when only the coefficients of the LC codebook are considered, increasing the rank to 4 when the value of L is '2' is smaller than the maximum payload size supported by NR, and therefore, it is possible to support the payload of the CSI without any additional enhancements of the feedback chain.

Therefore, when using the option 1, the following cases may exist.

<Proposal 1-1>

In the configuration of a codebook to support a specific rank R (e.g., 3 or 4) or higher based on the preceding combination, the number of base beams (e.g., DFT-beams) participating in linear combination may be limited to L (for example, 2) as a specific value. This method may be applied even when N1N2−L is greater than 0.

<Proposal 1-2>

In a transmitting end antenna configuration that satisfies N1N2≥m*L (m is a positive integer equal to or greater than 2, and L may be '2') in Proposal 1-1, the number X of layers composed of L beams may not be greater than L, and when the reported rank value R is greater than L, R−X layers may be configured by linearly combining a preselected L beam and exclusive beams in an orthogonal beam set. This method may be applied even when N1N2−L is greater than 0.

Proposal 1-2 may include the following examples. For example, in case of 8 ports, when N1N2 is '4', and the value of L is '2', there may be four orthogonal beams in one orthogonal beam set.

Here, two beams are selected and linear combination is performed to create a maximum of two layers, and the remaining two beams are linearly combined to create a maximum of two layers to configure a maximum rank of 4.

The indicator for subgroup selection/combination composed of L beams in 4 orthogonal beam sets is reported as a WB PMI or uses a combination of predetermined beam subgroups to distinguish a combination of (2,2) or a combination of (3, 1) or signal information on which combination is to be used from the base station to the terminal.

In the case of the option 2, the linear combination is performed for a specific X layer(s), and the information on the remaining layer configurations may be calculated using an orthogonalization procedure.

For example, a QR decomposition/Householder transform may be used, or a Gram-Schmidt method may be used. Hereinafter, the Gram-Schmidt process method will be described.

First, the X layer composed of the linear combination may be defined as wi∈ C^(2N_1 N_2×1), i=1, . . . ,X, the layer for (R−X) may be calculated through the following steps, and |•| represents Euclidean norm.

TABLE 14

| | WB amplitude (3bit) | | |
|---|---|---|---|
| | WB amplitude (3bit) (2L − 1) * 3 | SB phase (3bit, # of SB = 10) (2L − 1) * 3 * 10 | Total (WB PMI + SB PMI) * R |
| L = 2, R = 4 | 9 | 90 | 99 * 4 = 396 |
| L = 4, R = 2 | 21 | 210 | 231 * 2 = 462 |

Step 1: $u_1 = w_1$

Step 2: $u_2 = w_2 - \dfrac{u_1^H w_2}{u_1^H u_1} u_1$ $\vdots$

Step $X$: $u_X = w_X - \sum_{k=1}^{X-1} \dfrac{u_k^H w_X}{u_k^H u_k} u_k$

Step $X+1$: $u_{X+1} = w_{X+1} - \sum_{k=1}^{X} \dfrac{u_k^H w_{X+1}}{u_k^H u_k} u_k$ $\vdots$ Step $R$: $u_R = w_R - \sum_{k=1}^{R-1} \dfrac{u_k^H w_R}{u_k^H u_k} u_k$ Step $R+1$: $W^R = \dfrac{1}{\sqrt{R}} [\bar{u}_1 \ \bar{u}_2 \ \ldots \ \bar{u}_R]$ where $\bar{u}_k = \dfrac{u_k}{\|u_k\|}$ A method for determining these steps, w_(X+1), . . . , w_R is required. In this case, the method exemplified in the first and second embodiments may be determined and applied.

In the case of the first and second embodiments, this is a method for guaranteeing orthogonality by decoupling the configured DFT beam of 1 to X layers and X+1 to R layers.

Therefore, when each embodiment is applied to the Gram-Schmidt method, the second terms of each step become 0, so that the meaning of performing the orthogonalization process is lost, and the performance may also be reduced. To this end, Equation 21 below may be applied.

INITIALIZE $S_X = S$ [Equation 21]

FOR $k = X$ to $R$ step

Apply $w_k$ as $w_k = \begin{bmatrix} b_k \\ \phi_k b_{k'} \end{bmatrix}$ where $b_k, b_{k'} \in S_k$ $S_{k+1} = S_k \setminus \{b_k, b_{k'}\}$ In Equation 21 and Equation 22 below, k=k' may be assumed to reduce the payload of the CSI. Alternatively, $w_k$ configured through the orthogonalization process may be calculated by substitution as in Equation 22 below.

$w_k = \begin{bmatrix} a_k \phi_k b_k \\ b_{k'} \end{bmatrix}$ if $i_{1,3,k} = \text{``0''}$ [Equation 22]

$w_k = \begin{bmatrix} b_k \\ a_k \phi_k b_{k'} \end{bmatrix}$ if $i_{1,3,k} = \text{``1''}$ Alternatively, since the direction of the codebook is finally configured/determined by the orthogonalization process, the information on the amplitude and the phase coefficient may be omitted, thereby reducing the payload size of the CSI. That is, $w_k = \begin{bmatrix} b_k \\ b_k \end{bmatrix}$ may be used.

Alternatively, depending on whether or not bk is a beam participating in the linear combination as a combination of the above method, a configuration method (that is, a reported payload is different) of $w_k$ may be assumed differently.

For example, when bk is a beam participating in the linear combination, a relatively simple payload $w_k = \begin{bmatrix} b_k \\ b_k \end{bmatrix}$ may be used, and if a different orthogonal beam other than a beam participating in the linear combination is selected, the shape of $w_k = \begin{bmatrix} b_k \\ a_k \phi_k b_{k'} \end{bmatrix}$ or $w_k = \begin{bmatrix} a_k \phi_k b_k \\ b_{k'} \end{bmatrix}$ may be used.

Figure 17:
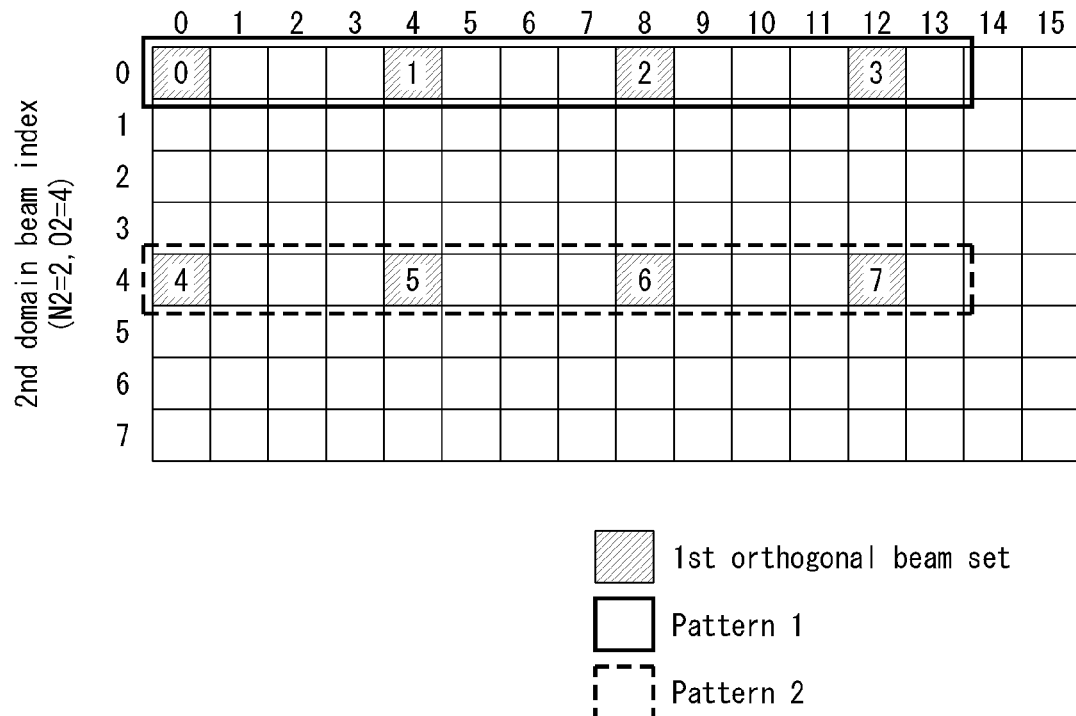
FIGS. 17 and 18 are diagrams illustrating an example of a beam setting method for maintaining orthogonality between beams proposed in the present specification.
Figure 18:
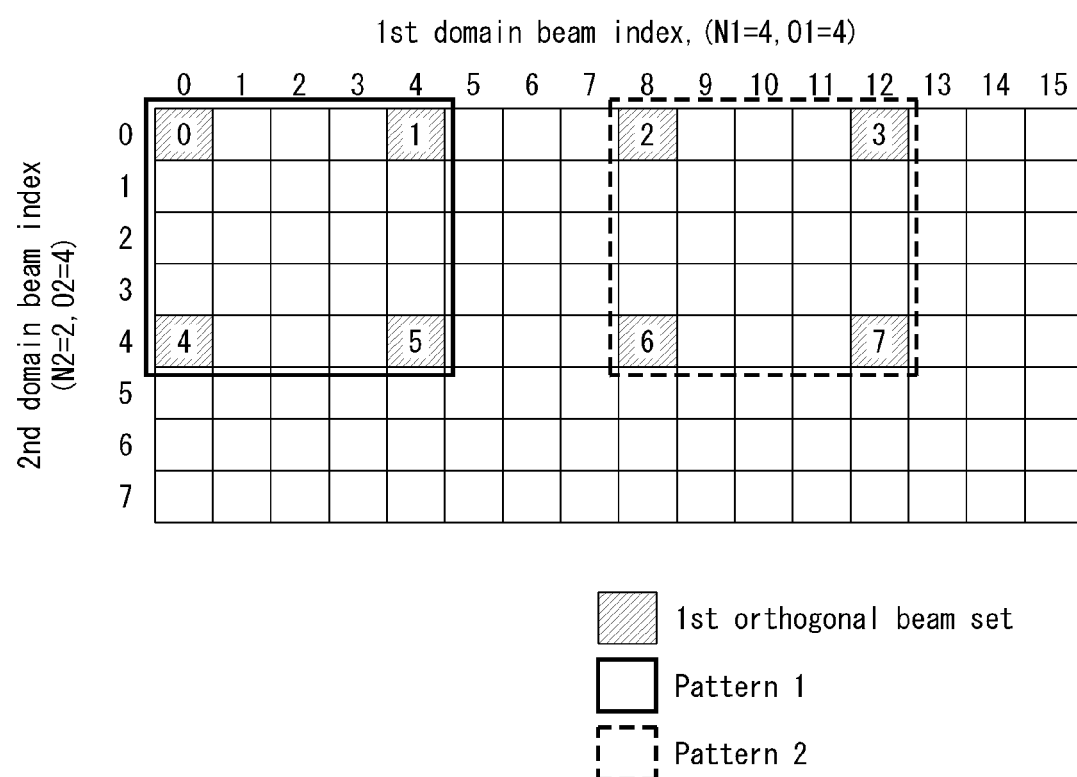

FIGS. 17 and 18 are diagrams illustrating an example of a beam setting method for maintaining orthogonality between beams proposed in the present specification.

When the R−X layer is configured as another method of the above-described method, a method in which the terminal additionally reports information on S configuring a search size of $w_k$ may be applied.

In this method, the terminal may reduce the complexity, and as an example, a method for selecting among beams participating in the LC may be applied by limiting to $S_X = \bar{S}$, or a value of $S_x$ may be determined according to a specific pattern.

FIGS. 17 and 18 are examples of determining such a pattern, and it may be assumed that a $1^{st}$ orthogonal beam set is determined for the LC. In the case of FIG. 17, it may be effective when the angular spread is large in the horizontal domain ($1^{st}$ domain), and in the case of FIG. 18, it may be effective when there is an intermediate angular spread in the horizontal/vertical domain.

As in the patterns of FIGS. 17 and 18, which of the plurality of patterns to use may be signaled from the base station to the terminal through the higher layer (for example, RRC and/or MAC CE) or the flexible signaling (for example, DCI) or may be set in advance.

Therefore, it may be determined whether to use the pattern of FIG. 17 or the pattern of FIG. 18 in a given pattern by WB PMI, and $w_k$ may be calculated and derived in the given set by the SB PMI.

Which of these methods to use may be signaled from the base station to the terminal through the higher layer or flexible signaling, or may be recommended to the base station by the terminal.

In addition, in the case of X in step 2, in the case of the beam composed of the linear combination, it may be formed semi-orthogonally.

This may occur based on a quantization error due to the coupling coefficient, and not performing the proposed orthogonalization procedure for this semi-orthogonal X layer may increase the complexity of the terminal/base station, so the process of step 2-X is performed and Equation 23 below may be assumed.

$u_k = w_k \ \forall k = 1, \ldots, X$ [Equation 23]

Therefore, in the orthogonalization procedure, whether to configure step 2-X in the same manner as described above is informed to the terminal from the base station, or may be determined in advance.

Alternatively, the terminal may perform the additional report to the base station through calculation of throughput, and the like. In this case, the CQI reported by the terminal becomes the CQI calculated using the final codebook that has undergone the orthogonalization process.

In addition, after the layer information of $u_1$, which is an initialization value of the orthogonalization procedure, is predetermined or recognized as a value corresponding to the LI reported by the terminal, the orthogonalization procedure may be performed in an ascending or descending order of the layer index afterwards.

In the case of the 4-port CSI-RS, when using the orthogonalization procedure, the reported PMI information of rank 3 and rank 4 is the same. The reason is that the rank 4 may be a full rank, and if three layers are known, the remaining layers may be easily calculated by finding null-spaces of three known layers.

That is, when the rank 4 is configured, linear combination coefficient information or beam selection information for layer 4 may be omitted, and it may be configured by finding a vector spanning null-space of layers 1, 2, and 3 (for example, calculated using SVD, etc.).

By this method, the payload size of the CSI may be reduced.

The method for determining $w_k$ by a terminal is preferably determined by the throughput calculated by the final codebook, which may greatly increase the complexity of the PMI search by the terminal. Therefore, the $w_k$ may be derived by performing the channel decomposition such as SVD and using the correlation with the k-th eigenvector corresponding to each layer.

That is, when a channel between the base station and the terminal is referred to as $H \in C^{N_{Rx} \times N_{Tx}}$, where $N_{RX}$ is the number of reception antenna ports of the terminal (receiver end), and $N_{TX}$ is the number of transmission antenna ports of the base station (transmitting end) (according to the example of the present disclosure, corresponding to 2N1N2). Then, H using singular value decomposition may be expressed as Equation 24 below.

$$H=USV^H \quad \text{[Equation 24]}$$

Where $U \in C^{N_{Rx} \times N_{Rx}}$ and $V \in C^{N_{Tx} \times N_{Tx}}$ are unitary matrix, and $S \in C^{N_{Rx} \times N_{Tx}}$ is a diagonal $N_{RX} \times N_{TX}$ matrix with non-negative real numbers (singular value) on the diagonal. Also, k-th eigenvector can be the k-th column vector of V matrix.

Alternatively, by using eigen value decomposition using a channel covariance matrix, $w_k$ may be calculated through Equation 25 below.

$$H^H H = VS^2 V^H \quad \text{[Equation 25]}$$

<Proposal 2>

For the RI value reported by the terminal, some layers are each independently configured by linear combination of a plurality of beams, and the remaining layers may be configured by applying the same precoder tor each polarization and specific layer(s) among some layers to ensure or maintain orthogonality, and to have orthogonality between different polarizations by using an orthogonal cover code (OCC, for example, a Walsh code of length 2).

Hereinafter, for convenience of description, X constituting the linear combination is assumed to be 1. At this time, the layer may be expressed by Equation 26 below $$v_1 = \frac{1}{\sqrt{\eta_1}} \begin{bmatrix} p_{1,1}c_{1,1}b_1 + \ldots + p_{L,1}c_{L,1}b_L \\ p_{L+1,1}c_{L+1,1}b_1 + \ldots + p_{2L,1}c_{2L,1}b_L \end{bmatrix} = \frac{1}{\sqrt{\eta_1}} \begin{bmatrix} v_{1,1} \\ v_{1,2} \end{bmatrix} \quad \text{[Equation 26]}$$

In the case of the method for configuring a codebook, since each polarization has two block diagonalization structures, OCC (for example, $$\begin{bmatrix} 1 & 1 \\ 1 & -1 \end{bmatrix})$$

of Walsh length 2 may be considered. This Walsh code is applied to $v_1$ to increase an orthogonalized layer, which may be in the form of Equation 27 below.

$$\frac{1}{\sqrt{2\eta_1}} \begin{bmatrix} v_{1,1} & v_{1,1} \\ v_{1,2} & -v_{1,2} \end{bmatrix} \quad \text{[Equation 27]}$$

In Equation 27, the normalization factor $\eta_i = \Sigma_{k=1}^{2L} p_{k,i}^2$, $\forall i=1, \ldots, X$, may play a role of making each column 1, and in this structure, the orthogonalization for each layer may be satisfied under the conditions (for convenience, is omitted) as shown in Equation 28 below.

$$\begin{bmatrix} v_{1,1} \\ v_{1,2} \end{bmatrix}^H \times \begin{bmatrix} v_{1,1} \\ -v_{1,2} \end{bmatrix} = \quad \text{[Equation 28]}$$

$$(p_{1,1}^2 + p_{2,1}^2 + \ldots p_{L,1}^2) - (p_{L+1,1}^2 + p_{L+2,1}^2 + \ldots p_{2L,1}^2) = 0$$

$$(p_{1,1}^2 + p_{2,1}^2 + \ldots p_{L,1}^2) = (p_{L+1,1}^2 + p_{L+2,1}^2 + \ldots p_{2L,1}^2)$$

That is, as shown in Equation 28, the orthogonality may be established under the same condition that the sum of squares of true green components that are linearly combined for each polarization are the same, and there may be two ways to satisfy these conditions as follows.

Option 1: The UE may calculate and derive the PMI under the constraints of the amplitude coupling coefficient as shown in Equation 29 below.

$$(p_{1,i}^2 + p_{2,i}^2 + \ldots p_{L,i}^2) = (p_{L+1,i}^2 + p_{L+2,i}^2 + \ldots p_{2L,i}^2)$$
$$\forall V=1,\ldots X \quad \text{[Equation 29]}$$

Option 2: When the UE reports an RI equal to or greater than Y, the calculation and derivation of the PMI may be performed under the assumption of a pol-common amplitude, or otherwise, a pol-independent amplitude is assumed.

In the case of the Option 1, it may be difficult to search and calculate the PMI of the terminal, and an optimal algorithm for finding a solution may be required. However, in terms of the degree of freedom of the solution, it is better than Option 2, so the performance may be improved than Option 2.

In the case of the Option 2, when a codebook of a specific rank or higher is applied/configured, pol-common amplitude, that is, $P_{i,j}=p_{L+i,j}$ where i=1, . . . , L, j=1, . . . , RI more strictly satisfying the above conditions may be considered.

In other words, the conditions may include an embodiment in which when the beams corresponding to each polarization are linearly combined, the amplitude combination is integrated for each polarization and only the phase is independently applied.

Alternatively, in order to reduce the payload size of the CSI, it may be considered to be configured as a phase common for each polarization. In this case, in the case of the linearly coupled beam selection, it may be the same as in Equation 30 below for each polarization ($v_1$ is taken as an example, and may be extended to $v_2$, . . . ).

$$\begin{bmatrix} p_{1,1}c_{1,1}b_1 + \ldots + p_{L,1}c_{L,1}b_L \\ p_{1,1}c_{L+1,1}b_1 + \ldots + p_{L,1}c_{2L,1}b_L \end{bmatrix} \quad \text{[Equation 30]}$$

Alternatively, it may be different as in Equation 31 below.

$$\begin{bmatrix} p_{1,1}c_{1,1}b_1 + \ldots + p_{L,1}c_{L,1}b_L \\ p_{1,1}c_{L+1,1}b_{L+1} + \ldots + p_{L,1}c_{2L,1}b_{2L} \end{bmatrix} \quad \text{[Equation 31]}$$

When the value of X is '1', the maximum number of Rs that may be configured using this method may be '2'. That is, assuming that the codebook of Rank 1 is assumed to be $$\frac{1}{\sqrt{\eta_1}} \begin{bmatrix} v_{1,1} \\ v_{1,2} \end{bmatrix},$$

the Rank 2 codebook configured by the OCC-2 may be composed of $$\frac{1}{\sqrt{2\eta_1}} \begin{bmatrix} v_{1,1} & v_{1,1} \\ v_{1,2} & -v_{1,2} \end{bmatrix}.$$

Accordingly, when the payload of the CSI configured by the above scheme is rank 1, it may be determined according to an LC codebook configuration parameter set (for example, beam selection, amplitude granularity, phase granularity) or the like.

In the case of the Rank 2, since only the OCC-2 needs to be applied to the given Rank 1 codebook, an additional feedback bit is not required. That is, rank 1 and rank 2 may be the same in terms of payload.

For each rank, the options 1 and 2 may vary depending on a method for applying the amplitude and/or phase of the layers configured in a linear combination, that is, whether polarization and/or subgroup is common or independent.

Accordingly, in terms of the complexity of the terminal, assumptions/algorithms and the like for configuring a codebook for each rank may vary, and in this case, the complexity may increase.

In order to solve this problem, a method for adding a scaling term to a newly configured layer by applying the OCC-2 may be considered, which is as shown in Option 3 below.

Option 3: The codebook of the rank 1 for the first layer of the rank 2 codebook may be reused or copied, and the OCC-2 may be applied by combining with the scaling term (alpha) for layer orthogonality as shown in Equation 32 below $$\frac{1}{\sqrt{2\eta_1}} \begin{bmatrix} v_{1,1} & \frac{1}{\sqrt{1+\alpha^2}} v_{1,1} \\ v_{1,2} & -\frac{\alpha}{\sqrt{1+\alpha^2}} v_{1,2} \end{bmatrix} \text{ where} \quad \text{[Equation 32]}$$

$$\alpha = \frac{\sum_{k=1}^{L} p_{k,i}^2}{\sum_{k=L+1}^{2L} p_{k,i}^2}, \forall i = 1, \ldots X$$

When configured in this way, since the linear combination parameter set of each layer constituting the rank 1 and rank 2 may be shared, the complexity of the terminal may be reduced.

This method may be extended to higher ranks such as Rank 3 or 4. For convenience of description, it is assumed that the layer X constituting the linear combination is 2. At this time, the layer may be expressed as Equation 33 below.

[Equation 33]

$$v_1 = \frac{1}{\sqrt{\eta_1}} \begin{bmatrix} p_{1,1}c_{1,1}b_1 + \ldots + p_{L,1}c_{L,1}b_L \\ p_{L+1,1}c_{L+1,1}b_1 + \ldots + p_{2L,1}c_{2L,1}b_L \end{bmatrix} = \frac{1}{\sqrt{\eta_1}} \begin{bmatrix} v_{1,1} \\ v_{1,2} \end{bmatrix},$$

$$v_2 = \frac{1}{\sqrt{\eta_2}} \begin{bmatrix} p_{1,2}c_{1,2}b_1 + \ldots + p_{L,2}c_{L,2}b_L \\ p_{L+1,2}c_{L+1,2}b_1 + \ldots + p_{2L,2}c_{2L,2}b_L \end{bmatrix} = \frac{1}{\sqrt{\eta_2}} \begin{bmatrix} v_{2,1} \\ v_{2,2} \end{bmatrix}$$

In this case, when Option 1, Option 2, or Option 3 is satisfied, the codebook of the rank 3 may be expressed as one of two types as shown in Equation 34 below. Hereinafter, for convenience of description, it is assumed that the equations follow Options 1 and 2.

$$\frac{1}{\sqrt{3}} \begin{bmatrix} \frac{1}{\sqrt{\eta_1}} v_{1,1} & \frac{1}{\sqrt{\eta_1}} v_{1,1} & \frac{1}{\sqrt{\eta_2}} v_{2,1} \\ \frac{1}{\sqrt{\eta_1}} v_{1,2} & -\frac{1}{\sqrt{\eta_1}} v_{1,2} & \frac{1}{\sqrt{\eta_2}} v_{2,2} \end{bmatrix} \text{ or } \quad \text{[Equation 34]}$$

$$\frac{1}{\sqrt{3}} \begin{bmatrix} \frac{1}{\sqrt{\eta_1}} v_{1,1} & \frac{1}{\sqrt{\eta_2}} v_{2,1} & \frac{1}{\sqrt{\eta_2}} v_{2,1} \\ \frac{1}{\sqrt{\eta_1}} v_{1,2} & \frac{1}{\sqrt{\eta_2}} v_{2,2} & -\frac{1}{\sqrt{\eta_2}} v_{2,2} \end{bmatrix}$$

In Equation 34, the information on which layer to apply the Walsh code, that is, whether to create an orthogonal layer by setting OCC to which of $v_1$ and $v_2$ may have the characteristics of WB PMI, or may be tied to LI and determined to be applied as OCC for a layer referred to as LI.

Alternatively, in order to improve this in terms of performance, this information may be reported per SB with the characteristics of the SB PMI, and in the above example, may be 1 bit per SB.

In the case of the rank 4, it may be expressed as Equation 35 below $$\frac{1}{\sqrt{4}} \begin{bmatrix} \frac{1}{\sqrt{\eta_1}} v_{1,1} & \frac{1}{\sqrt{\eta_1}} v_{1,1} & \frac{1}{\sqrt{\eta_2}} v_{2,1} & \frac{1}{\sqrt{\eta_2}} v_{2,1} \\ \frac{1}{\sqrt{\eta_1}} v_{1,2} & -\frac{1}{\sqrt{\eta_1}} v_{1,2} & \frac{1}{\sqrt{\eta_2}} v_{2,2} & -\frac{1}{\sqrt{\eta_2}} v_{2,2} \end{bmatrix} \quad \text{[Equation 35]}$$

The minimum value of X for configuring the Rank 4 should be 2. In particular, when X is 2, additional feedback bits for the WB or SB PMI may not be required. If X is 3, WB or SB PMI of 2 bits (information on which layer of X=1, 2, 3 to apply OCC-2) may be required.

In the case of the method for configuring rank 3 or rank 4, the codebook may be extendedly applied without a small number of bits or an additional payload. However, in the case of $v_1$ and $v_2$, although almost semi-orthogonal through the linear combination process, the orthogonality with a newly formed layer by applying the OCC-2 may not always be established. That is, Equation 36 below should be always be satisfied.

$$\begin{bmatrix} v_{1,1} \\ v_{1,2} \end{bmatrix}^H \times \begin{bmatrix} v_{2,1} \\ v_{2,2} \end{bmatrix} \approx 0 \text{ and } \begin{bmatrix} v_{1,1} \\ -v_{1,2} \end{bmatrix}^H \times \begin{bmatrix} v_{2,1} \\ v_{2,2} \end{bmatrix} \approx 0 \quad \text{[Equation 36]}$$

Alternative 1: The orthogonal procedure method of Proposal 1 may be applied to the layer generated by applying the OCC-2.

Alternative 2: The LC codebook may be configured to satisfy $v_{1,1} \perp v_{2,1}$ and $v_{1,2} \perp V_{2,2}$ The contents of Alternative 1 are the same as those described in Proposal 1, and therefore are omitted, and Alternative 2 will be described.

In the case of Alternative 2, it may be recognized as configuring an LC solution to satisfy the limitation of $v_{1,1} \perp v_{2,1}$ and $v_{1,2} \perp v_{2,2}$ and or performing LC independently for each polarization. As a representative example of such independent performance, there may be the method for using a channel for each polarization.

Assuming that the channel between the base station and the terminal is $H \in C^{N_{Rx} \times 2N_1 N_2}$, $H = [H_1 \ H_2]$ and $H_i \in C^{N_{Rx} \times N_1 N_2}$ i=1,2.

For example, a channel the receiving end with the transmission port corresponding to "V-slant" of the transmitting end may be referred to as $H_1$, and the channel of the receiving end with the transmitting port corresponding to "H-slant" of the transmitting end may be referred to as $H_2$.

In this case, the linear combination uses a channel decoupled into $H_1$ and $H_2$, applies SVD for each channel, and derives an optimal linear combining parameter set using the correlation degree with the k-th eigenvector corresponding to each layer to derive $v_{k,1}$ from $H_1$ and $v_{k,2}$ from $H_2$ (k=1, . . . , X).

Then, through the LC process, a codebook that satisfies the condition $v_{1,1} \perp v_{2,1}$ and $v_{1,2} \perp v_{2,2}$ may be configured. In such a configuration, the beam selection may be independently set/applied for performance improvement or integrated to reduce the size of the payload, and in the case of the strongest layer indicator, information per existing layer is reported by 1, and may be reported to each layer and each polarization.

In the case of X, which is the number of layers performing LC, it may be predetermined or set by the base station. Alternatively, when the terminal reports the optimal X through calculation, the information on the value of X is included in part 1 of CSI to be used to determine part 2 of CSI, or may be implicitly determined in #of non-zero wideband amplitude coefficient indication field.

That is, when R=3 and X=2, two layers may have the number of beams with one or more non-zero amplitude, and the remaining one layer may be indicated as a beam with a non-zero amplitude of 1 or 0, and it may be recognized that the OCC is applied as many as the number of corresponding layers.

In order to distinguish from the beam selection, 1 may be recognized as beam selection and 0 may be recognized as OCC application. In addition, the value of R to which this proposal is applied may be predetermined, or may be set by the base station through the higher layer (for example, RRC and/or MAC CE) or the flexible signaling (for example, DCI).

That is, the terminal may receive the PMI from the base station and calculate a CQI value using the orthogonal procedure, and may report the PMI and CQI calculated in the LC codebook for reporting to the base station. In this case, since the base station receives values to which the orthogonal procedure is not applied and recognizes the orthogonal procedure, the base station may decode the PMI.

In this case, the OCC-2 may be used for the orthogonal procedure.

In the case of such a proposal, since the OCC-2 may be used, the maximum number of layers that may be composed of the same beam may be 2, and the usability thereof may be limited.

In order to utilize this more flexibly, the following suggestions may be applied.

Figure 19:
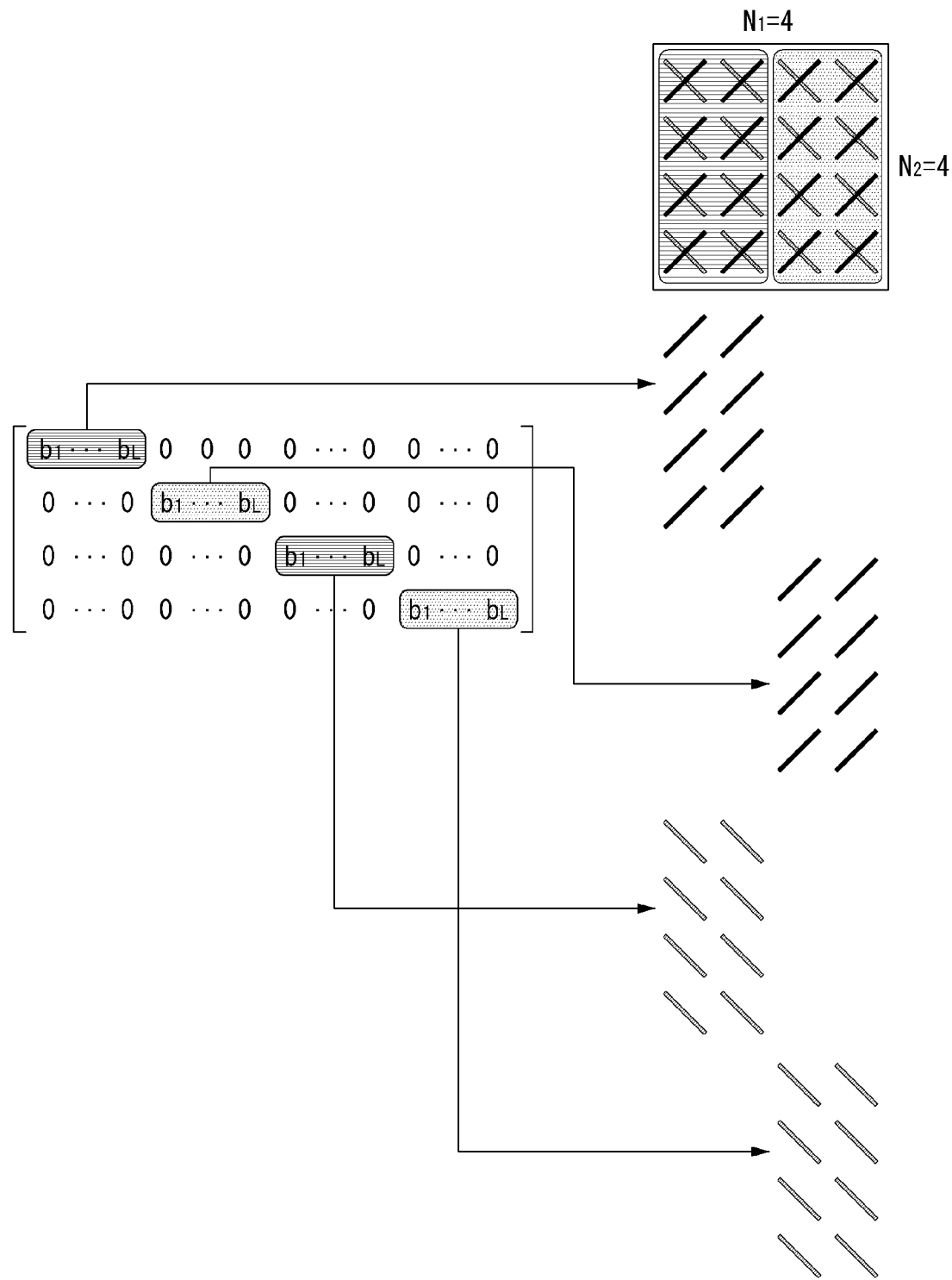
FIG. 19 is a diagram illustrating an example of a codebook proposed in the present disclosure.

FIG. 19 is a diagram illustrating an example of a codebook proposed in the present disclosure.

<Proposal. 3>

When the terminal may measure a channel with a CSI-RS of Y-port or more, and reports the CSI using the linear combination codebook such as the Type II codebook, the number (e.g., 2) of specific layers in the rank R codebook X may be linearly combined with L DFT beams having a length of N1N2/2 independently, and the remaining layers (R–X) may be configured to have an orthogonal relationship with each other by applying OCC-4 between different subgroups and/or polarizations in a specific layer among X layers to ensure orthogonality.

FIG. 19 illustrates a subgroup linear combination used in a 32-port (Y=32) CSI-RS. As illustrated in FIG. 19, the length of the DFT beams constituting each linear combination may be N1N2/2 (for example, $$b_i \in C^{\frac{N_1 N_2}{2} \times 1}$$

and L of N1N2/2 orthogonal beams are selected), and the 1$^{st}$ domain is divided into two for each polarization and may represent a case of having two subgroups.

In addition to this example, the case of dividing the 2$^{nd}$ domain or other subgrouping is not excluded.

In the case of using such a method, when the sufficient granularity is not obtained due to the limit by the number of L in a configuration with many antennas, the performance may be improved when a degree of freedom is given.

Accordingly, a value of Y may be predetermined, or the base station may be set to the terminal through the higher layer or flexible signaling.

In this case, one layer of a codebook configured in a linear combination may be expressed as Equation 37 below $$\frac{1}{\sqrt{\eta_1}} \begin{bmatrix} p_{1,1}c_{1,1}b_1 + \ldots + p_{L,1}c_{L,1}b_L \\ p_{1,1}c_{L+1,1}b_1 + \ldots + p_{L,1}c_{2L,1}b_L \\ p_{1,1}c_{2L+1,1}b_1 + \ldots + p_{L,1}c_{3L,1}b_L \\ p_{1,1}c_{3L+1,1}b_1 + \ldots + p_{L,1}c_{4L,1}b_L \end{bmatrix} = \begin{bmatrix} v_{1,1} \\ v_{1,2} \\ v_{1,3} \\ v_{1,4} \end{bmatrix} = v_1 \quad \text{[Equation 37]}$$

Where $\eta_i = 4\Sigma_{k=1}^{L} = p_{k,i}^2$.

That is, similar to proposal 3, after applying the OCC, to satisfy the orthogonality, the amplitude coefficients of subgroups for each polarization may be assumed to be the same, and the phase may be applied independently to each subgroup/polarization. Alternatively, the same phase may be applied to each polarization and/or each subgroup.

The OCC-4 (for example, $$\begin{bmatrix} 1 & 1 & 1 & 1 \\ 1 & 1 & -1 & -1 \\ 1 & -1 & -1 & 1 \\ 1 & -1 & 1 & -1 \end{bmatrix})$$

may be applied to such a linear combination codebook, and when such OCC-4 is applied, a maximum of 4 layers extended to $v_1$ may be obtained as shown in Equation 38 below.

$$\begin{bmatrix} v_{1,1} & v_{1,1} & v_{1,1} & v_{1,1} \\ v_{1,2} & v_{1,2} & -v_{1,2} & -v_{1,2} \\ v_{1,3} & -v_{1,3} & -v_{1,3} & v_{1,3} \\ v_{1,4} & -v_{1,4} & v_{1,4} & -v_{1,4} \end{bmatrix} = V_1 \quad \text{[Equation 38]}$$

If extended based on $v_2$, it may be as shown in Equation 39.

$$\begin{bmatrix} v_{2,1} & v_{2,1} & v_{2,1} & v_{2,1} \\ v_{2,2} & v_{2,2} & -v_{2,2} & -v_{2,2} \\ v_{2,3} & -v_{2,3} & -v_{2,3} & v_{2,3} \\ v_{2,4} & -v_{2,4} & v_{2,4} & -v_{2,4} \end{bmatrix} = V_2 \quad \text{[Equation 39]}$$

If the value of X is 1, a codebook is composed of $v_1$, and each rank is determined and configured by column selection, and the information of the PMI may be WB or SB. For example, when configured as shown in Table 15 below, the codebook is composed of 2 bits for rank 2, 1 bit for rank 3, and 0 bits for rank 4, and when index 1 is reported to the rank 2, the codebook may be configured as shown in Equation 40 below.

$$\begin{bmatrix} v_{1,1} & v_{1,1} \\ v_{1,2} & -v_{1,2} \\ v_{1,3} & -v_{1,3} \\ v_{1,4} & v_{1,4} \end{bmatrix} \quad \text{[Equation 40]}$$

TABLE 15

| Index | Rank 2 | Rank 3 | Rank 4 |
|---|---|---|---|
| 0 | (1, 2) | (1, 2, 3) | (1, 2, 3, 4) |
| 1 | (1, 3) | (1, 2, 4) | |
| 2 | (1, 4) | | |

If the value of X is '2', the codebook may be composed of a combination of $v_1$ and $v_2$, Table 16 below may be included to determine which LC-based layer is composed of a codebook, and the information on index selection may be WB nature or SB nature. According to Table 16, the rank 3 codebook may be composed of $v_1$ and $v_2$, and the remaining one layer may be composed of columns of a matrix reported as an index. That is, when rank=3 and index 1, it is as shown in Equation 41 below.

TABLE 16

| Index | Rank 3 | Rank 4 |
|---|---|---|
| 0 | ($V_1$, 2) | ($V_1$, 2, 3) |
| 1 | ($V_1$, 3) | ($V_1$, 2, 4) |
| 2 | ($V_1$, 4) | ($V_1$, 3, 4) |
| 3 | ($V_2$, 2) | ($V_2$, 2, 3) |
| 4 | ($V_2$, 3) | ($V_2$, 2, 4) |
| 5 | ($V_2$, 4) | ($V_2$, 3, 4) |
| 6 | | ($V_1$, 2) + ($V_2$, 2) |
| 7 | | ($V_1$, 2) + ($V_2$, 3) |
| 8 | | ($V_1$, 2) + ($V_2$, 4) |
| 9 | | ($V_1$, 3) + ($V_2$, 2) |
| 10 | | ($V_1$, 3) + ($V_2$, 3) |
| 11 | | ($V_1$, 3) + ($V_2$, 4) |
| 12 | | ($V_1$, 4) + ($V_2$, 2) |
| 13 | | ($V_1$, 4) + ($V_2$, 3) |
| 14 | | ($V_1$, 4) + ($V_2$, 4) |

$$\begin{bmatrix} v_{1,1} & v_{2,1} & v_{1,1} \\ v_{1,2} & v_{2,2} & -v_{1,2} \\ v_{1,3} & v_{2,3} & -v_{1,3} \\ v_{1,4} & v_{2,4} & v_{1,4} \end{bmatrix} \quad \text{[Equation 41]}$$

In addition, when the rank is '4' and the index is '6', it is as shown in Equation 42 below.

$$\begin{bmatrix} v_{1,1} & v_{1,1} & v_{2,1} & v_{2,1} \\ v_{1,2} & v_{1,2} & v_{2,2} & v_{2,2} \\ v_{1,3} & -v_{1,3} & v_{2,3} & -v_{2,3} \\ v_{1,4} & -v_{1,4} & v_{2,4} & -v_{2,4} \end{bmatrix} \quad \text{[Equation 42]}$$

When the rank is 4, since there are a total of 15 possible combinations of codebooks, 4 bits are required, but in the case of SB nature, a subset of these combinations may be used because it requires a large payload.

In the codebook design, each layer is generalized to $$\frac{1}{\sqrt{R}}$$

in order to generalize the final codebook for each rank to 1.

When the value of X is '2', orthogonality may be a problem as mentioned in proposal 2. That is, the orthogonality between $v_1$ and $v_2$ with a layer newly composed of OCC-4 may be a problem.

However, in this case, compared to proposal 2, many combinations are selected, and the performance degradation may be reduced by selecting the best combination. Alternatively, this can be overcome by extending the alterative of Proposal 2.

For example, assuming that the channel between the base station and the terminal is $H \in C^{N_{Rx} \times 2N_1 N_2}$, $H=[H_1 \ H_2 \ H_3 \ H_4]$, and $H_i \in C^{N_{Rx} \times N_1 N_2/2}$ i=1,2,3,4. For example, it may be assumed that the subgroup 1 of the transmission port corresponding to the "V-slant" of the transmitting end and the channel of the receiving end is $H_1$, the subgroup 2 of the transmission port corresponding to the transmitting end "V-slant" and the channel of the receiving end is $H_2$, the subgroup 1 of the transmission port corresponding to "H-slant" of the transmitting end and the channel of the receiving end is $H_3$, and the subgroup 2 of the transmission port corresponding to the "H-slant" of the transmitting end and the channel of the receiving end is $H_4$.

In this case, the linear combination uses channels decoupled from $H_1$ to $H_4$, applies SVD to each channel, and derives the optimal linear combination parameter set by using the correlation degree with the k-th eigenvector corresponding to each layer to derive from (k=1, . . . ,X, j=1, . . . ,4). Alternatively, like Alternative 2 of Proposal 2, Proposal 3 may be applied by performing LC for each polarization.

In the case of X, which is the number of layers performing LC, it may be predetermined or set by the base station. Alternatively, when the terminal reports the optimal X through calculation, the information on the X value is included in part 1 CSI as a separate field to be used to determine part 2 CSI, or may be implicitly determined in #of non-zero wideband amplitude coefficient indication field. That is, when R=3 and X=2, two layers may have the number of beams with one or more non-zero amplitude, and the remaining one layer may be indicated as a beam with a non-zero amplitude of 1 or 0, and it may be recognized that the OCC is applied as many as the number of corresponding layers.

In order to distinguish it from the beam selection, 1 may be interpreted as beam selection and 0 may be interpreted as OCC application. In addition, the value of R to which the above proposal is applied may be predetermined, or may be set by the base station through the higher layer or flexible signaling.

Proposal 2 and 3 are vary according to the method for applying the amplitude and/or phase of the layers configured in linear combination according to the rank, that is, whether the polarization and/or subgroups are common or independent. In addition, when both the proposal 2 and proposal 3 are used, the base station ma set/apply to the terminal through the higher layer or flexible signaling (e.g., DCI) which codebook configuration method (i.e., OCC length) to use. Alternatively, which of the two schemes is used (for example, OCC length and/or OCC value) may be included in Part 1 CSI and reported to the base station.

<Proposal 4>

When the terminal reports a value of a specific rank to the base station, specific parameter sets for setting the codebook may be set differently according to layers.

That is, when the terminal reports a specific value (e.g., 'R') as the value of RI, a linear combination parameter set (e.g., granularity of amplitude, granularity of phase, #of combining beams) applied for each layer may be applied/configured differently.

In other words, a linear combination codebook may be generated by applying differently a linear combination parameter set according to at least one layer index of a specific rank or the index of a layer group.

In the case of Proposal 4, when a specific R-rank codebook is configured, in the case of a specific X layer, the SINR or the eigen value(s) corresponding to the X layer is large, and thus the effect on the overall MIMO performance may be large.

Accordingly, a codebook may be configured by performing LC with a higher granularity set than that of other layers, and the other R-X layer may be configured by performing LC with a codebook parameter set having relatively small granularity. In this case, when the value of X is 1, it may be tied to a layer indicated by LI.

Hereinafter, in the present disclosure, the reduction of the parameter set constituting a specific layer is referred to as "parameter compression". For example, in the case of the Rank 4 codebook, when the value of X is 2, two layers may constitute a codebook with a 3-bit amplitude, 3-bit phase, and L=4, but the remaining two layers may constitute a codebook with compression as a 2-bit amplitude, 2-bit phase, and L=2, and parameters constituting each set may be compressed, applied/configured independently.

Such information may be predetermined, or the base station may be set the information to the UE through the higher layer (for example, RRC and/or MAC CE) or flexible signaling (for example, DCI).

Alternatively, the terminal may report the setting of the codebook configuration parameter to the base station by calculation. At this time, the information should be included in the Part 1 CSI and reported. In this case, a parameter associated with compression is reported as a separate field for each layer or for each layer group according to the X value, or a value corresponding to the X layer may always be determined to use the maximum parameter or preset values. Only compression parameter information on layers to be performed may be included in part 1 CSI and reported. At this time, each parameter is encoded as a separate field and reported.

Alternatively, in order to further reduce the payload of CSI, a plurality of parameter sets are transmitted to the terminal by the higher layer (e.g., RRC and/or MAC CE) such as RRC or MAC CE or flexible signaling (e.g., DCI), and the terminal calculates which parameter set is used for each layer/layer group and reported by being included in Part 1 CSI. Alternatively, only the information on the compression parameter set is included in the Part 1 CSI and reported.

That is, the base station may include a plurality of parameter sets in configuration information transmitted through higher layer signaling or DCI and transmit the sets to the terminal, and the terminal selects one of the transmitted parameter sets to generate a codebook.

Thereafter, the terminal may include information related to the used parameter set in part 1 of the CSI and transmit the information to the base station.

The value of R to which the above proposal is applied may be predetermined, or may be set by the base station through the higher layer or flexible signaling. Alternatively, in consideration of the condition in which the terminal omits some SB PMI reporting, a payload in which the omission does not occur may be calculated, and the R and/or X value may be included in the Part 1 CSI and reported to the base station.

For example, one of the parameter sets for generating the codebook may be a parameter p for determining the number of columns based on the matrix of the frequency axis for generating the codebook.

In this case, the value of p may vary according to the number of layers as shown in Table 17 below

TABLE 17

| RI | Layer | L | p |
|---|---|---|---|
| 1 | 0 | $x_0$ | $y_0$ |
| 2 | 0 | | |
|   | 1 | | |
| 3 | 0 | | $y_0$ |
|   | 1 | | |
|   | 2 | | $y_2$ |
| 4 | 0 | | $y_0$ |
|   | 1 | | |
|   | 2 | | $y_2$ |
|   | 3 | | |

<Proposal 5>

When the terminal configures the codebook through the linear combination, the specific parameter set for setting the codebook may be configured differently according to rank.

Specifically, when the terminal configures the codebook based on the linear combination, the linear combination parameter sets (for example, granularity of amplitude, granularity of phase, #of combining beams) may be applied/configured differently according to the rank value.

In this proposal, a codebook for each rank is configured based on a linear combination. In this case, each layer (for example, a rank 4 codebook composed of 4 layers) in the codebook for each rank may be independently encoded based on the same LC parameter set.

For example, a codebook can be configured such that the rank 1-2 codebook is composed of 3-bit amplitude, 3-bit phase, and L=4, and the rank 3-4 codebook is, for each layer, composed of 2 bit amplitude, 2 bit phase, and L=2. As in the above example, which LC parameter set is used by a codebook of a certain rank is predetermined, or may be configured in the terminal by the base station through the higher layer or flexible signaling.

Alternatively, a plurality of LC parameter sets may be notified to the UE through RRC, and the terminal may calculate a payload that does not occur in consideration of the condition of omitting some SB PMI reporting, and provide information on the most suitable LC parameter set to the base station by including the information in the Part 1 CSI.

For example, one of the parameter sets for generating the codebook may be a parameter p for determining the number of columns based on the matrix of the frequency axis for generating the codebook.

In this case, the value of p may vary according to the rank value as shown in Table 18 below.

TABLE 18

| RI | Layer | L | p |
|----|-------|---|---|
| 1  | 0     | $x_0$ | $y_0$ |
| 2  | 0     |   |   |
|    | 1     |   |   |
| 3  | 0     |   | $v_0$ |
|    | 1     |   |   |
|    | 2     |   |   |
| 4  | 0     |   |   |
|    | 1     |   |   |
|    | 2     |   |   |
|    | 3     |   |   |

<Proposal 6>

When it is configured to report the SB amplitude in the LC codebook (for example, Type II codebook mode 2), even when the terminal reports R as the value of RI, the SB and/or WB amplitude is reported only to a specific X layer, and only the WB is reported to the remaining (R−X) layer.

The codebook type, the mode, and the like to be used by the terminal is indicated/configured through the higher layer (RRC) in NR are indicated/set. Mode 1 of Type II CSI assumes WB amplitude, and in the case of Mode 2, it is composed of WB amplitude and SB amplitude (differential from WB amplitude).

When the terminal reports the SB amplitude, the payload may increase. In particular, assuming that the frequency selectivity experienced by each layer is different, it may be redundant to report the SB amplitude for all layers.

Therefore, in this proposal, the terminal is configured to report the SB amplitude, and when reporting the Rank R, the terminal may report the SB and/or WB amplitude only for specific X layers, and may report only WB amplitude for the remaining (RX) layers.

In this case, a specific X layer may be predetermined, or may be set by the base station through the higher layer or flexible signaling. Alternatively, for more accurate channel reflection, the information (e.g., information on which X layer among the number and/or R layers to perform WB and/or SB reporting) on the X layer may be included in the reported content by the terminal, or may be reported by being included in the Part 1 CSI, or only the strongest layer indicated by the LI value may perform the WB and/or SB report or the remaining layers may be predetermined as performing the WB reporting Alternatively, the LI may perform the role of indicating a plurality of (X) layers to perform the above proposal, and the value of X may be indicated to the terminal by the base station.

In the case of Proposal 6, the amplitude information may be replaced with phase information and applied as it is, or the terminal may configure both the amplitude and phase information as the SB amplitude reporting according to Proposal 7, and when reporting Rank R, SB and/or WB amplitude and/or phase may be reported only to specific X layers, and only WB amplitude and/or phase may be reported only to the remaining (R-X) layer.

As another example of the present disclosure, when the terminal configures the codebook through the linear combination, a specific parameter set for setting the codebook may be set differently according to the number of layers (LI value) and/or rank.

For example, one of the parameter sets for generating the codebook may be a parameter p for determining the number of columns based on the matrix of the frequency axis for generating the codebook.

In this case, the value of p may vary according to the rank value and the layer value as shown in Table 19 below.

TABLE 19

| RI | Layer | L | p |
|----|-------|---|---|
| 1  | 0     | $x_0$ | $y_0$ |
| 2  | 0     |   |   |
|    | 1     |   |   |
| 3  | 0     |   | $v_{3,0}$ |
|    | 1     |   | $v_{3,1}$ |
|    | 2     |   | $v_{3,2}$ |
| 4  | 0     |   | $v_{4,0}$ |
|    | 1     |   | $v_{4,1}$ |
|    | 2     |   | $v_{4,2}$ |
|    | 3     |   | $v_{4,3}$ |

Specifically, when the terminal configures the codebook based on the linear combination, the linear combination parameter sets (for example, granularity of amplitude, granularity of phase, #of combining beams) may be applied/configured differently according to the rank value and the number of layers.

<Proposal 7>

When the terminal reports the value of RI as "R" in the codebook-based CSI feedback proposed in the present disclosure, when the payload of the corresponding PMI is larger than the PUSCH or PUCCH resource set for CSI feedback, the CSI may be omitted.

At this time, the SB PMI information for single or multiple X layers indicated or preset by LI or indicated by the base station has a higher priority than the SM PMI information for the remaining (R−X) layers, and when omitted, the SM PMI for the (R−X) layer may be omitted first.

In this case, the omission rule may be as shown in Table 20 below.

TABLE 20

Priority 0:
Part 2 wideband CSI for CSI reports 1 to $N_{Rep}$
Priority 1:
Part 2 subband CSI of X layer(s) in
even subbands for CSI report 1
Priority 2:
Part 2 subband CSI of (R-X) layer(s) in
even subbands for CSI report 1
Priority 3:
Part 2 subband CSI of X layer(s) in
odd subbands for CSI report 1
Priority 4:
Part 2 subband CSI of (R-X) layer(s) in
odd subbands for CSI report 1
.
.
.
Priority $4N_{Rep}$−3:
Part 2 subband CSI of X layer(s) in
even subbands for CSI report $N_{Rep}$
Priority $4N_{Rep}$−2:
Part 2 subband CSI of (R-X) layer(s) in
even subbands for CSI report $N_{Rep}$
Priority $4N_{Rep}$−1:
Part 2 subband CSI of X layer(s) in
odd subbands for CSI report $N_{Rep}$
Priority $4N_{Rep}$:
Part 2 subband CSI of (R-X) layer(s) in
odd subbands for CSI report $N_{Rep}$ That is, if the size of the PUSCH or PUCCH resource allocated by the base station is smaller than the payload of the CSI reported by the terminal, the terminal may omit a part of the CSI subband according to the description of Table 20.

<Proposal 8>

When the base station configures the codebook in the SB and/or WB amplitude mode in the linear combination codebook-based CSI feedback including the codebooks proposed in Proposal 1 to 7, the number (for example, 2L DFT beams in type II) K value of basis beams to which the SB amplitude is applied may be differently set according to the rank and/or L value reported by the terminal.

Specifically, in one embodiment of the proposal, when the NR Type II CSI codebook mode 2 is set, the K value has values of 4, 4, and 6 according to the number (L=2, 3, 4) of linearly combined basis beams below rank 2. In this proposal, for example, in rank 3 or higher, it may be determined as K=2, 2, 3 for L=2, 3, 4, or may be fixed to a specific value (e.g., K=2) independent of L.

As a modified example of this proposal, K values applied to a specific X layer and the remaining (R−X) layers in a given Rank R codebook may be applied differently. For example, when X=2, it may be determined as K=4, 4, 6 (for L=2, 3, 4) for the first and second layers, and may be determined as K=2, 2, 3 for L=2, 3, 4 after the third layer or may be fixed as a specific value (for example, K=2) independent of L. Here, the X layer may be a single layer or a plurality of layers indicated by LI, or may be indicated to the terminal by the base station or may be predetermined.

<Proposal 9>

In the CSI feedback based on the linear combination codebook including the proposed codebook in the 2D antenna configuration based on the X-pol antenna configuration, the application range of the coefficient (amplitude and/or phase) of the linear combination applied to the linear combination according to the rank reported by the terminal may vary.

Specifically, the application range of the linear combination coefficient can be distinguished whether it is applied independently or commonly applied to each polarization in the X-pol antenna.

Option 1: Pol-independent, layer-independent: $p_{i,j}$, $c_{i,j}$
where i=1, . . . , 2L, j=1, . . . , RI Option 2: Pol-common, layer-independent: $p_{i,j}=p_{L+i,j}$, $c_{i,j}=c_{L+i,j}$ where i=1, . . . , L, j=1, . . . , RI In this proposal, it may be assumed differently whether option 1 or option 2 is used depending on the RI reported by the terminal, and the information on the RI to which this proposal is applied may be predetermined or configured in the terminal by the base station. When both the amplitude and phase coefficients are assumed to be the pol-common, the performance degradation may occur. Therefore, the option 2 may be applied to only one of the two coefficients and the option 1 may be applied to the remaining coefficients. For example, the amplitude may be set to the option 2 and the phase may be set to the option 1.

As the modified example of the above proposal, when the terminal reports to the base station with RI=R, option 1' may be applied to the X layer, and option 2' may be applied to the remaining (R−X) layers.

In Equation 42 below, it is assumed that a specific X layer is continuous, but it is obviously applicable to an X layer that is not continuous.

Option 1: *Pol*-independent, layer-independent: $p_{i,j}, c_{i,j}$
where i=1, . . . ,2L, j=1, . . . ,RI Option 2: *Pol*-common, layer-independent:
$p_{i,j}=p_{L+i,j}$, $c_{i,j}=c_{L+i,j}$ where i=1, . . . ,L, j=1, . . . ,RI  [Equation 42]

When both the amplitude and phase coefficients are assumed to be the pol-common, the performance degradation may occur. Therefore, the option 2 may be applied to only one of the two coefficients and the option 1 may be applied to the remaining coefficients. For example, the amplitude may be set to the option 2 and the phase may be set to the option 1. In addition, the X layer may be a single layer or a plurality of layers indicated by LI, or may be indicated to the terminal by the base station or may be predetermined.

As another modified example of the above proposal, the LC coefficient may be set/applied independently of each polarization/layer for a specific X layer, and some information of the LC coefficient and codebook parameter applied to the (R−X) layers may be limited to be used as the same value, and some information of the LC coefficient and codebook parameter is independently applied to configure/report the codebook. The above some information may be amplitude information, phase information, and strongest beam index, and the above some information may be selected by the base station and notified to the terminal, or may be selected by the terminal and reported to the base station by being included in the Part 1 CSI.

Figure 20:
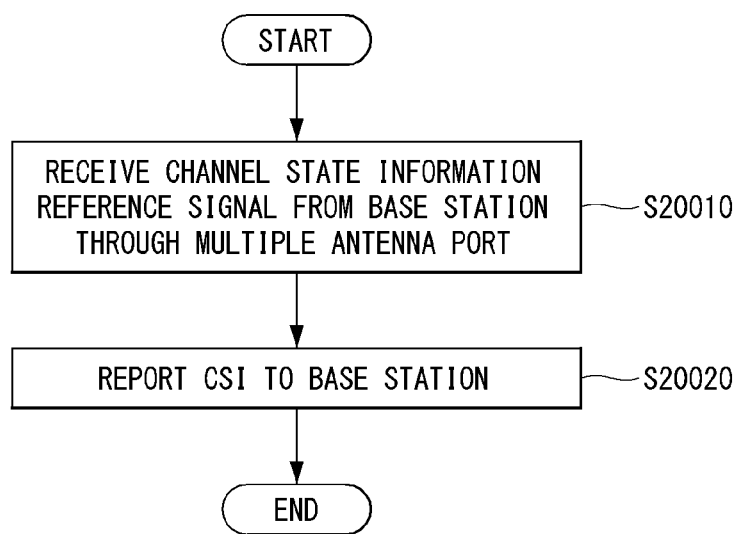
FIG. 20 is a flowchart illustrating an example of a CSI reporting procedure of a terminal proposed in the present specification.

FIG. 20 is a flowchart illustrating an example of a CSI reporting procedure of a terminal proposed in the present specification.

Referring to FIG. 20, when the terminal generates a codebook for CSI reporting, a parameter set for generating the codebook may be set differently according to rank and/or layer.

Specifically, the terminal receives a channel state information reference signal (CSI-RS) from the base station through multiple antenna ports (S20010).

The terminal may calculate PMI and CQI, which are CSI parameters for a channel, based on the received CSI-RS, and may report CSI including the calculated values to the base station (S20020).

In this case, the CSI may be type II and may be composed of Part 1 and Part 2. Part 1 may include RI and CQI, and Part 2 may include the PMI.

Part 1 has a fixed payload size, and Part 1 may be used to identify the information bits of Part 2.

At this time, CSI includes a precoding matrix indicator for a codebook generated by linear combination as described in proposals 1 to 8, and the codebook may be generated based on a specific parameter set.

In addition, a specific parameter set for generating a codebook by a linear combination may be set differently based on at least one of a rank value or a layer indicator related to a layer of a specific rank, as described in proposals 4 and 5.

Figure 22:
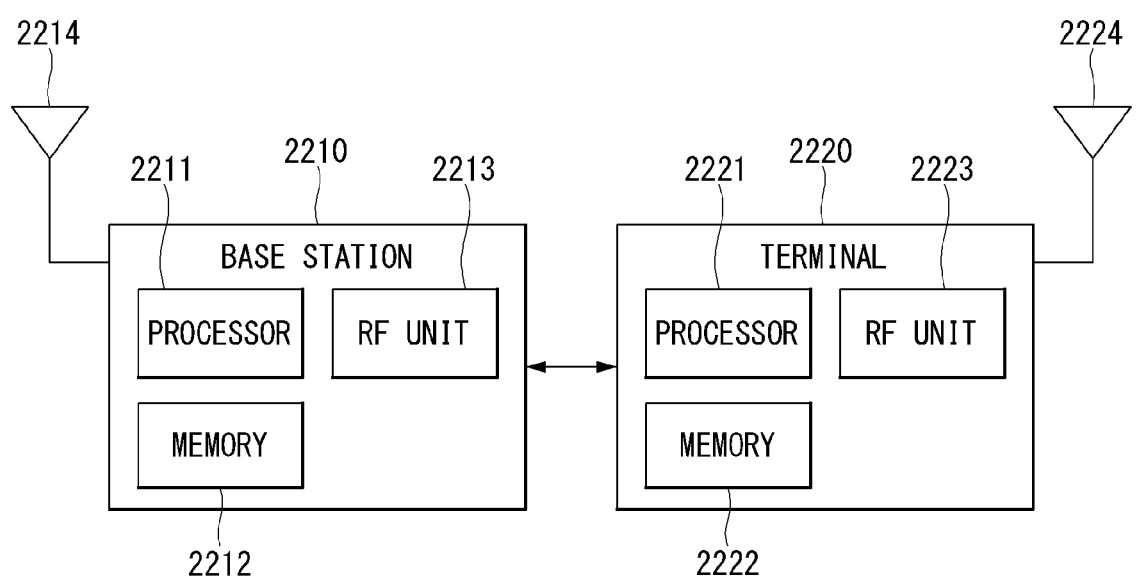
FIG. 22 is a block configuration diagram of a wireless communication apparatus to which the methods proposed in the present specification may be applied.
Figure 23:
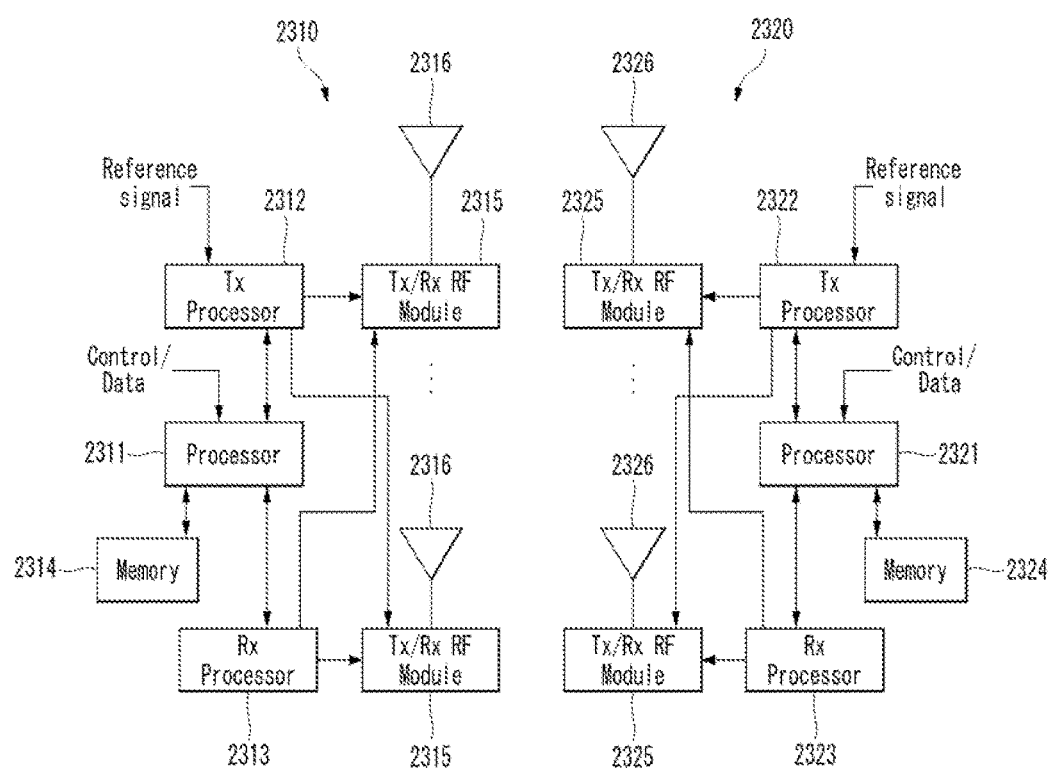
FIG. 23 is a block configuration diagram of a wireless communication apparatus to which the methods proposed in the present specification may be applied.

In this regard, the operation of the terminal described above may be specifically implemented by terminal apparatuses 2220 and 2320 illustrated in FIGS. 22 and 23 of the present specification. For example, the operation of the terminal described above may be performed by the processors 2221 and 2321 and/or the RF unit (or module) 2223 and 2325.

Specifically, the processors 2221 and 2321 receive channel state information reference signals from the base station through multiple antenna ports through the RF units (or modules) 2223 and 2325.

The processors 2221 and 2321 may calculate the PMI and CQI, which are CSI parameters for a channel, based on the CSI-RS received through the RF unit (or module) 2223 and 2325, and include the CSI including the calculated values to the base station (S20020).

In this case, the CSI may be type II and may be composed of Part 1 and Part 2. Part 1 may include RI and CQI, and Part 2 may include the PMI.

Part 1 has a fixed payload size, and Part 1 may be used to identify the information bits of Part 2.

At this time, CSI includes a precoding matrix indicator for a codebook generated by linear combination as described in proposals 1 to 8, and the codebook may be generated based on a specific parameter set.

In addition, a specific parameter set for generating a codebook by a linear combination may be set differently based on at least one of a rank value or a layer indicator related to a layer of a specific rank, as described in proposals 4 and 5.

Figure 21:
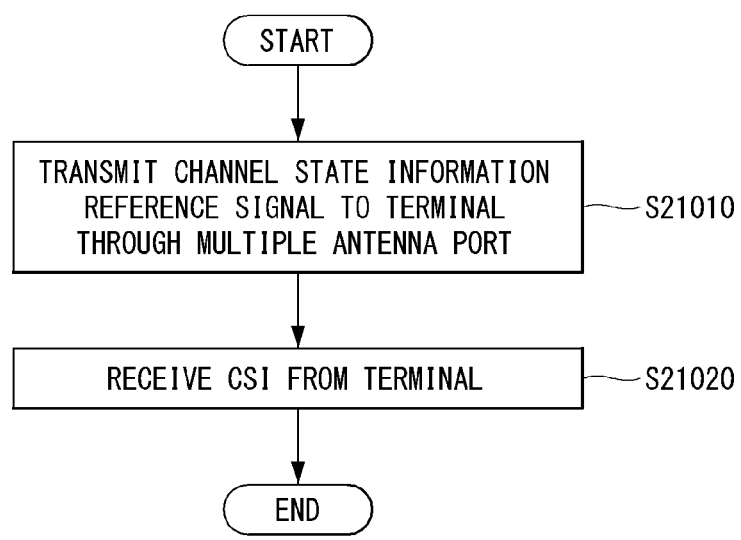
FIG. 21 is a flowchart illustrating an example of a procedure for a base station to receive CSI reporting from the terminal proposed in the present specification.

FIG. 21 is a flowchart illustrating an example of a procedure for a base station to receive CSI reporting from the terminal proposed in the present specification.

Specifically, the base station receives a channel state information reference signal (CSI-RS) to the terminal through multiple antenna ports (S2110).

The base station may receive the CSI from the terminal (S21020).

In this case, the CSI may be type II and may be composed of Part 1 and Part 2. Part 1 may include RI and CQI, and Part 2 may include the PMI.

Part 1 has a fixed payload size, and Part 1 may be used to identify the information bits of Part 2.

At this time, CSI includes a precoding matrix indicator for a codebook generated by linear combination as described in proposals 1 to 8, and the codebook may be generated based on a specific parameter set.

In addition, a specific parameter set for generating a codebook by a linear combination may be set differently based on at least one of a rank value or a layer indicator related to a layer of a specific rank, as described in proposals 4 and 5.

In this regard, the operation of the base station described above may be specifically implemented by base station apparatuses 2210 and 2310 illustrated in FIGS. 22 and 23 of the present specification. For example, the operation of the base station described above may be performed by the processors 2211 and 2311 and/or the RF unit (or module) 2213 and 2315.

Specifically, the processors 2211 and 2121 transmit channel state information reference signals to terminal through multiple antenna ports through the RF units (or modules) 2123 and 2125.

The processors 2121 and 2121 receive CSI from the terminal based on the CSI-RS received through the RF units (or modules) 2123 and 2125.

In this case, the CSI may be type II and may be composed of Part 1 and Part 2. Part 1 may include RI and CQI, and Part 2 may include the PMI.

Part 1 has a fixed payload size, and Part 1 may be used to identify the information bits of Part 2.

At this time, CSI includes a precoding matrix indicator for a codebook generated by linear combination as described in proposals 1 to 8, and the codebook may be generated based on a specific parameter set.

In addition, a specific parameter set for generating a codebook by a linear combination may be set differently based on at least one of a rank value or a layer indicator related to a layer of a specific rank, as described in proposals 4 and 5.

General Devices to which the Present Disclosure can be Applied

FIG. 22 is a block configuration diagram of a wireless communication apparatus to which the methods proposed in the present specification may be applied.

Referring to FIG. 22, a wireless communication system includes a base station 2210 and a plurality of terminals 2220 located in an area of the base station 2210.

Each of the base station and the terminal may be represented by a wireless device.

The base station 2210 includes a processor 2211, a memory 2212, and a radio frequency module (RF module) 2213. The processor 2211 implements the functions, the processes, and/or the methods described above with reference to FIGS. 1 to 22. The layers of the radio interface protocol may be implemented by the processor. The memory 2212 is connected to the processor and stores various pieces of information for driving the processor. The RF module 2213 is connected to the processor and transmits and/or receives a radio signal.

The terminal 2220 includes a processor 2221, a memory 2222, and an RF module 2223.

The processor 2221 implements the functions, the processes, and/or the methods described above with reference to FIGS. 1 to 21. The layers of the radio interface protocol may be implemented by the processor. The memory 2222 is connected to the processor and stores various pieces of information for driving the processor. The RF module 2223 is connected to the processor and transmits and/or receives a radio signal.

The memories 2212 and 2222 may be inside or outside the processors 2211 and 2221 and may be connected to the processors 2211 and 2221 by various well-known means.

Also, the base station 2210 and/or the terminal 2220 may have a single antenna or multiple antennas.

FIG. 23 illustrates a block configuration diagram of a communication device according to an embodiment of the present disclosure.

In particular, FIG. 23 is a diagram illustrating the terminal of FIG. 22 in more detail.

Referring to FIG. 23, a terminal may be configured to include a processor (or a digital signal processor (DSP)) 2310, an RF module (or RF unit) 2335, a power management module 2305, an antenna 2340, a battery 2355, a display 2315, a keypad 2320, a memory 2330, a subscriber identification module (SIM) card 2325 (this configuration is optional), a speaker 2345, and a microphone 2350. The terminal may also include a single antenna or multiple antennas.

The processor 2310 implements the functions, the processes, and/or the methods described above with reference to FIGS. 1 to 19. The layers of the radio interface protocol may be implemented by the processor.

The memory 2330 is connected to the processor and stores information related to the operation of the processor. The memory 2330 may be inside or outside the processor 1810 and may be connected to the processor by various well-known means.

The user inputs command information such as a telephone number, for example, by pressing (or touching) a button on the keypad 2320 or by voice activation using the microphone 2350. The processor is processed to receive the command information and perform a proper function as placing a call by a phone number. Operational data may be extracted from the SIM card 2325 or the memory 2330. In addition, the processor may display command information or driving information on the display for the user to recognize and for convenience.

The RF module 2335 is connected to the processor and transmits and/or receives the RF signal. The processor transmits command information to the RF module to transmit, for example, a radio signal constituting voice communication data to initiate communication. The RF module includes a receiver and a transmitter for receiving and transmitting a radio signal. The antenna 2340 functions to transmit and receive the radio signal. When receiving the radio signal, the RF module may transmit a signal and convert the signal into baseband to be processed by the processor. The processed signal may be converted into audible or readable information output through the speaker 2345.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and can implement embodiments of the disclosure. The order of operations described in embodiments of the disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the disclosure can be implemented by various means, for example, hardware, firmware, software, or combinations thereof. When embodiments are implemented by hardware, one embodiment of the disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the disclosure can be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL APPLICABILITY

The method for mapping a reference signal in a wireless communication system of the present disclosure has been described focusing on examples applied to the 3GPP LTE/LTE-A system and 5G system (New RAT system), but can be applied to various wireless communication systems.

The invention claimed is:

1. A method for transmitting channel state information (CSI) by a user equipment (UE) in a wireless communication system, comprising:
   receiving a channel state information reference signal (CSI-RS) from a base station through a multiple antenna port; and
   reporting the CSI to the base station,
   wherein the CSI includes a precoding matrix indicator (PMI) for a codebook generated by linear combination,
   wherein the codebook is configured based on a parameter set for the linear combination,
   wherein the parameter set for the linear combination is differently set/applied based on whether a rank value is (i) one of a rank 1 and a rank 2 or (ii) one of a rank 3 and a rank 4,
   wherein the CSI includes (i) a wideband PMI and (ii) a subband PMI,
   wherein the parameter set for the linear combination includes (i) a parameter for a number of beams to be linearly combined and (ii) a parameter related to the subband PMI, and
   wherein a payload of the CSI is determined based on (i) the parameter for the number of the beams to be linearly combined and (ii) the parameter related to the subband PMI.

2. The method of claim 1, further comprising:
   receiving, from the base station, information on the parameter set for the linear combination through higher layer signaling.

3. The method of claim 1, wherein the parameter set for a case where the rank value is the rank 1 and the parameter set for a case where the rank value is the rank 2 are identically set/applied.

4. The method of claim 3, wherein the parameter set for a case where the rank value is the rank 3 and the parameter set for a case where the rank value is the rank 4 are identically set/applied.

5. The method of claim 1, wherein the CSI consists of a first part and a second part,
wherein the first part includes a rank indicator (RI), a channel quality indicator (CQI), and an indicator indicating the number of combining coefficients having an amplitude of a positive real value, and
wherein the second part includes the PMI.

6. The method of claim 5, wherein the first part has a fixed payload size and is used to identify the number of information bits of the second part.

7. The method of claim 4, wherein the parameter set for (i) the case where the rank value is the rank 1 and (ii) the case where the rank value is the rank 2 are differently set/applied with the parameter set for (i) the case where the rank value is the rank 3 and (ii) the case where the rank value is the rank 4.

8. The method of claim 1, wherein the parameter set is identically set/applied to each layer.

9. A method for receiving channel state information (CSI) by a base station in a wireless communication system, comprising:
transmitting a channel state information reference signal (CSI-RS) to a terminal through a multi-antenna port; and
receiving CSI from the terminal,
wherein the CSI includes a precoding matrix indicator (PMI) for a codebook generated by linear combination,
wherein the codebook is configured based on a parameter set for the linear combination,
wherein the parameter set for the linear combination is differently set/applied based on whether a rank value is (i) one of a rank 1 and a rank 2 or (ii) one of a rank 3 and a rank 4,
wherein the CSI includes (i) a wideband PMI and (ii) a subband PMI,
wherein the parameter set for the linear combination includes (i) a parameter for a number of beams to be linearly combined and (ii) a parameter related to the subband PMI, and
wherein a payload of the CSI is determined based on (i) the parameter for the number of the beams to be linearly combined and (ii) the parameter related to the subband PMI.

10. A user equipment (UE) for transmitting channel state information (CSI) in a wireless communication system, the UE comprising:
a RF (Radio Frequency) module including a transceiver for transmitting and receiving a radio signal; and
a processor for controlling the RF module, wherein the processor,
receiving a channel state information reference signal (CSI-RS) from a base station through a multiple antenna port; and
reporting the CSI to the base station,
wherein the CSI includes a precoding matrix indicator (PMI) for a codebook generated by linear combination,
wherein the codebook is configured based on a parameter set for the linear combination,
wherein the parameter set for the linear combination is differently set/applied based on whether a rank value is (i) one of a rank 1 and a rank 2 or (ii) one of a rank 3 and a rank 4,
wherein the CSI includes (i) a wideband PMI and (ii) a subband PMI,
wherein the parameter set for the linear combination includes (i) a parameter for a number of beams to be linearly combined and (ii) a parameter related to the subband PMI, and
wherein a payload of the CSI is determined based on (i) the parameter for the number of the beams to be linearly combined and (ii) the parameter related to the subband PMI.

11. The UE of claim 10, wherein the processor,
receiving, from the base station, information on the parameter set for the linear combination through higher layer signaling.

12. The UE of claim 10, wherein the parameter set for a case where the rank value is the rank 1 and the parameter set for a case where the rank value is the rank 2 are identically set/applied.

13. The UE of claim 12, wherein the parameter set for a case where the rank value is the rank 3 and the parameter set for a case where the rank value is the rank 4 are identically set/applied.

14. The UE of claim 10, wherein the CSI consists of a first part and a second part,
wherein the first part includes a rank indicator (RI), a channel quality indicator (CQI), and an indicator indicating the number of combining coefficients having an amplitude of a positive real value, and
wherein the second part includes the PMI.

15. The UE of claim 14, wherein the first part has a fixed payload size and is used to identify the number of information bits of the second part.

16. The UE of claim 13, wherein the parameter set for (i) the case where the rank value is the rank 1 and (ii) the case where the rank value is the rank 2 are differently set/applied with the parameter set for (i) the case where the rank value is the rank 3 and (ii) the case where the rank value is the rank 4.

17. The UE of claim 10, wherein the parameter set is identically set/applied to each layer.

* * * * *